(12) United States Patent
Krueger et al.

(10) Patent No.: US 10,170,984 B2
(45) Date of Patent: Jan. 1, 2019

(54) SWITCHED MODE POWER CONVERTER WITH PEAK CURRENT CONTROL

(71) Applicant: Infineon Technologies Austria AG, Villach (AT)

(72) Inventors: Martin Krueger, Oberschleissheim (DE); Daniel Bichler, Munich (DE); Jing Hu, Neubiberg (DE); Markus Schmid, Augsburg (DE); Juergen Stahl, Munich (DE)

(73) Assignee: INFINEON TECHNOLOGIES AUSTRIA AG, Villach (AT)

( * ) Notice: Subject to any disclaimer, the term of this patent is extended or adjusted under 35 U.S.C. 154(b) by 0 days.

(21) Appl. No.: 15/279,117

(22) Filed: Sep. 28, 2016

(65) Prior Publication Data
US 2018/0091046 A1 Mar. 29, 2018

(51) Int. Cl.
*H02M 7/68* (2006.01)
*H02M 3/156* (2006.01)
*H02M 1/08* (2006.01)
*H02M 1/00* (2006.01)

(52) U.S. Cl.
CPC ............. *H02M 3/156* (2013.01); *H02M 1/08* (2013.01); *H02M 2001/0009* (2013.01)

(58) Field of Classification Search
CPC ...... H02M 1/42; H02M 1/4225; H02M 3/158; Y02B 70/126
USPC ... 363/21.08, 21.12, 37, 67, 81, 89, 97, 127; 323/207, 225, 282–285
See application file for complete search history.

(56) References Cited

U.S. PATENT DOCUMENTS

| | | | | |
|---|---|---|---|---|
| 5,001,620 A * | 3/1991 | Smith | ................. | H02M 1/4225 323/222 |
| 5,457,624 A * | 10/1995 | Hastings | ............... | H02M 3/158 363/127 |
| 5,949,229 A * | 9/1999 | Choi | ................... | H02M 1/4225 323/222 |
| 6,674,655 B2 * | 1/2004 | Giannopoulos | ... | H02M 3/33507 363/21.01 |
| 6,906,500 B2 * | 6/2005 | Kernahan | ............. | H02M 3/157 323/225 |
| 6,961,253 B1 * | 11/2005 | Cohen | ..................... | H02M 1/08 363/89 |

(Continued)

OTHER PUBLICATIONS

Adragna, C., et al., "New Fixed Off-Time PWM Modulator Provides Constant Frequency Operation in Boost PFC Pre-regulators," International Symposium on Power Electronics, Electrical Drives, Automation and Motion, Jun. 11-13, 2008, pp. 656-661.

(Continued)

*Primary Examiner* — Rajnikant Patel
(74) *Attorney, Agent, or Firm* — Slater Matsil, LLP

(57) ABSTRACT

In accordance with an embodiment, a method, includes operating a power converter that comprises an electronic switch connected in series with an inductor in one of a first operation mode and a second operation mode. Operating the power converter in each of the first operation mode and the second operation mode includes driving the electronic switch in a plurality of successive drive cycles based on drive parameter. Each of the plurality of drive cycles includes an on-time in which the electronic switch is switched on and an off-time in which the electronic switch is switched off.

24 Claims, 10 Drawing Sheets

(56) References Cited

U.S. PATENT DOCUMENTS

| | | | | |
|---|---|---|---|---|
| 7,019,506 | B2* | 3/2006 | Kernahan | H02M 1/0845 323/284 |
| 8,541,991 | B2* | 9/2013 | Lopata | H02M 3/1588 323/224 |
| 8,692,532 | B2* | 4/2014 | Lopata | H02M 3/1588 323/224 |
| 8,970,194 | B2* | 3/2015 | Li | G05F 1/575 323/282 |
| 9,455,623 | B2* | 9/2016 | Fan | |
| 9,479,046 | B2* | 10/2016 | Lin | H02M 1/42 |

OTHER PUBLICATIONS

Bottrill, J., "Current-sense transformer circuit design for average current-mode control," Mar. 15, 2012, pp. 1-6, http:/www.electronicproducts.com/Passive_Components/Magnetics_Inductors_Transformers/Current-sense_transformer_circuit_design_for_average_current-mode_control.aspx.

CCM-PFC, ICE3PCS02G, "Standalone Power Factor Correction (PFC) Controller in Continuous Conduction Mode (CCM)," Infineon, Version 2.0, May 5, 2010, pp. 1-20.

Gegner, J., et al., "Linear Peak Current Mode Control: A Simple Active Power Factor Correction Control Technique for Continuous Conduction Mode," vol. 1, 1996, pp. 196-202, IEEE.

Li, J., "Current-Mode Control: Modeling and its Digital Application," Apr. 14, 2009, pp. 1-197.

Lim, S., et al., "A Simple Digital DCM Control Scheme for Boost PFC Operating in Both CCM and DCM," IEEE Transactions on Industry Applications, vol. 47, No. 4, Jul./Aug. 2011, pp. 1802-1812.

Microsemi, "Voltage-Mode, Current-Mode (and Hysteretic Control)," Technical Note TN-203, Rev. 0.6, Nov. 2012, pp. 1-19.

XMC1000, XMC4000 32-bit Microcontroller Series for Industrial Applications, "Capture Compare Unit 4 (CCU4)," Infineon, V1.0, Jul. 2015, pp. 1-54.

\* cited by examiner

SWITCHED MODE POWER CONVERTER WITH PEAK CURRENT CONTROL

TECHNICAL FIELD

This disclosure in general relates to a power converter circuit, in particular a power converter circuit with peak current control.

BACKGROUND

Switched mode power converters, which may also be referred to as switched mode power supplies (SMPS), are widely used for converting power in different types of automotive, industrial, consumer electronic or household applications. A switched mode power converter includes at least one inductor, an electronic circuit connected in series with the at least one inductor, and a rectifier circuit coupled to the at least one inductor. The series circuit with the at least one inductor and the electronic switch is coupled to an input where the power converter receives an input power, and the rectifier circuit is coupled to an output where the power converter supplies an output power. The input power, which is an input voltage multiplied with an input current, and, therefore, the output power, which is an output voltage multiplied with an output current, can be controlled by controlling a current through the at least one inductor. Controlling the current through the at least one inductor may include operating the electronic switch in a pulse-width modulated (PWM) fashion.

In a power converter with peak current control a controller detects a current flowing through the at least one inductor and switches off the electronic switch each time the current reaches a predefined threshold. The controller may switch on the electronic switch at a fixed frequency; this can be referred to as fixed frequency control. Alternatively, the controller may switch on the electronic switch after a fixed delay time (off-time) after the electronic switch has been switched off; this can be referred to as fixed off-time control.

Due to parasitic effects oscillations of the current flowing through the inductor may occur in a short time period after switching on the electronic switch. Those oscillations may cause the current to rise above the threshold for a short time. In order to prevent the controller from switching off the electronic switch triggered by those oscillations the controller may employ a minimum on-time. That is, the electronic switch is switched on at least for the minimum on-time and the controller starts to monitor the current flowing through the inductor not before the end of the minimum on-time. This, however, may cause the input power of the power converter to be higher than required which, in turn, may cause the output voltage to increase.

SUMMARY

One example relates to a method. The method includes operating a power converter that includes an electronic switch connected in series with an inductor in one of a first operation mode and a second operation. Operating the power converter in each of the first operation mode and the second operation mode includes driving the electronic switch in a plurality of successive drive cycles based on drive parameter, wherein each of the plurality of drive cycles includes an on-time in which the electronic switch is switched on and an off-time in which the electronic switch is switched off, wherein a duration of each of the plurality of drive cycles is dependent on the drive parameter, wherein the drive parameter is predefined in the first operation mode, and wherein the drive parameter is adapted in the second operation mode such that a duration of the on-time is above a predefined duration threshold.

Another example relates to a power converter. The power converter includes an electronic switch connected in series with an inductor, and a controller. The controller is configured to operate the power converter in one of a first operation mode and a second operation mode and, in each of the first operation mode and the second operation mode, to drive the electronic switch in a plurality of successive drive cycles based on a drive parameter such that each of the plurality of drive cycles comprises an on-time in which the electronic switch is switched on and an off-time in which the electronic switch is switched off, wherein a duration of each of the plurality of drive cycles is dependent on the drive parameter. The drive parameter is predefined in the first operation mode. Furthermore, the controller is configured to adapt the drive parameter in the second operation mode such that a duration of the on-time is above a predefined duration threshold.

BRIEF DESCRIPTION OF THE DRAWINGS

Examples are explained below with reference to the drawings. The drawings serve to illustrate certain principles, so that only aspects necessary for understanding these principles are illustrated. The drawings are not to scale. In the drawings the same reference characters denote like features.

DETAILED DESCRIPTION OF ILLUSTRATIVE EMBODIMENTS

In the following detailed description, reference is made to the accompanying drawings. The drawings form a part of the description and by way of illustration show specific embodiments in which the invention may be practiced. It is to be understood that the features of the various embodiments described herein may be combined with each other, unless specifically noted otherwise.

Figure 1:
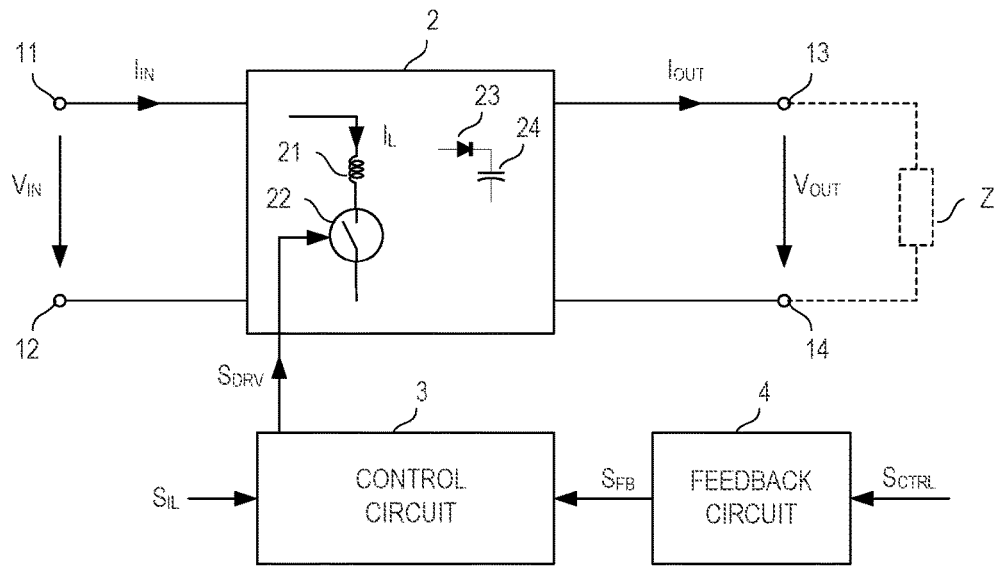
FIG. 1 schematically illustrates a switched-mode power converter circuit according to one example.

FIG. 1 shows a power converter (switched mode power supply, SMPS) according to one embodiment. Referring to FIG. 1, the power converter includes an input configured to receive an input voltage $V_{IN}$ and an input current $I_{IN}$, and an output configured to supply an output voltage $V_{OUT}$ and an output current $I_{OUT}$. The input may include a first input node 11 and a second input node 12, and the output may include a first output node 13 and a second output node 14. A load Z (illustrated in dashed lines in FIG. 1.) may receive the output voltage $V_{OUT}$ and the output current $I_{OUT}$ available at the output 13, 14.

An inductor and rectifier circuit 2 receives the input voltage $V_{IN}$ and the input current $I_{IN}$ and supplies the output voltage $V_{OUT}$ and the output current $I_{OUT}$ based on the input voltage $V_{IN}$ and the input current $I_{IN}$. The inductor and rectifier circuit 2 includes an inductor 21 connected in series with an electronic switch 22 and a rectifier circuit. Referring to FIG. 1, the rectifier circuit may include a capacitor 24 and a rectifier element 23. The rectifier element 23 is drawn as a diode in FIG. 1. This, however, is only an example. Any other type of rectifier element such as an electronic switch operated as a synchronous rectifier (SR) may be used as well. The electronic switch 22 connected in series with the inductor 21 is driven by a drive signal $S_{DRV}$ generated by a controller 3. Referring to FIG. 1, the controller 3 may generate the drive signal $S_{DRV}$ based on an inductor current signal $S_{IL}$ and a feedback signal generated by a feedback circuit 4.

The inductor current signal $S_{IL}$ represents a current $I_L$ through the inductor 21. According to one example, the inductor current signal $S_{IL}$ is proportional to the inductor current $I_L$. The inductor current signal $S_{IL}$ may be generated based on the inductor current $I_L$ by any type of current measurement circuit (not shown) that is configured to measure the current $I_L$ through the inductor 21.

According to one example, the feedback circuit is configured to generate the feedback signal $S_{FB}$ based on a control signal $S_{CTRL}$. The control signal $S_{CTRL}$ represents at least one parameter of the power converter circuit that is to be regulated. According to one example, the power converter circuit is configured to regulate the output voltage $V_{OUT}$. In this case, the control signal $S_{CTRL}$ represents the output voltage $V_{OUT}$. According to one example, the control signal $S_{CTRL}$ is proportional to the parameter to be regulated. The control signal $S_{CTRL}$ can be generated using any type of measurement circuit (not shown) that is suitable to measure the parameter that is to be regulated.

FIG. 1 does not show in detail how the inductor 21 and the electronic switch 22 are connected to the input 11, 12. The way of how the inductor 21 and the electronic switch 22 are connected to the input 11, 12 is dependent on the specific topology of the inductor rectifier circuit 2. Examples of some topologies are explained with reference to drawings further below. According to one example, the series circuit with the inductor 21 and the electronic circuit 22 are coupled to the input 11, 12 such that the inductor current $I_L$ increases when the electronic switch 22 switches on and decreases when the electronic switch 22 is switches off. The drive signal $S_{DRV}$ is a pulse-width modulated (PWM) signal according to one example, so that by varying a duty cycle of the drive signal $S_{DRV}$, the input current $I_{IN}$ and, therefore, the input power, which is the input voltage $V_{IN}$ multiplied with the input current $I_{IN}$, can be controlled in order to regulate the at least one parameter, such as the output voltage $V_{OUT}$.

According to one example, the controller 3 is a peak current controller. In this case, the controller 3 drives the electronic switch 22 in a plurality of successive drive cycles wherein each drive cycle includes an on-period in which the electronic switch 22 is switched on (is in an on-state) and an off-period in which the electronic switch 22 is switched off (is in an off-state). The on-periods end when the current $I_L$ through the inductor 21 reaches a predefined threshold.

Figure 2:
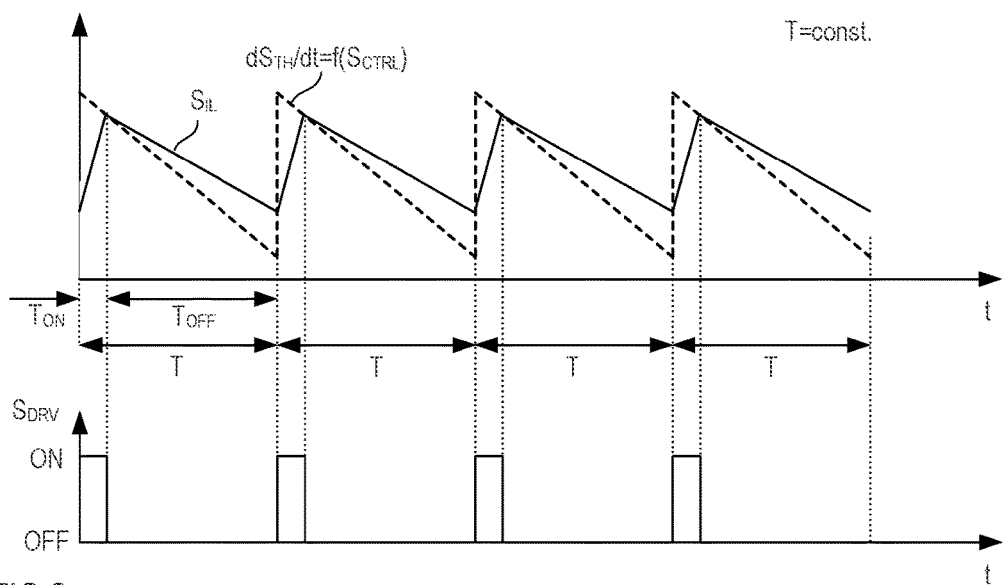
FIG. 2 shows timing diagrams that illustrate operation of the power converter circuit in a fixed frequency mode.

FIG. 2 shows timing diagrams that illustrate one example of a peak current control of the power converter circuit shown in FIG. 1. In particular, FIG. 2 shows timing diagrams of the inductor current signal $S_{IL}$, a threshold signal $S_{TH}$, and of the drive signal $S_{DRV}$. Referring to FIG. 2, the drive signal $S_{DRV}$ has an on-level that switches on the electronic switch 22 or an off-level that switches off the electronic switch 22. Just for the purpose of illustration, the on-level is drawn as a high level and the off-level is drawn as a low level in the timing diagram shown in FIG. 2.

The timing diagrams shown in FIG. 2 illustrate several successive drive cycles. In this example, each of these drive cycles has the same duration T, that is, the duration T of the individual drive cycles is fixed. A frequency f of the drive cycles is given by the reciprocal of the duration T, f=1/T, so that the frequency is also fixed if the duration T is fixed. This type of operation mode is referred to as fixed frequency mode in the following. In FIG. 2, $T_{ON}$ denotes the duration of an on-period and $T_{OFF}$ denotes a duration of one off-period in one drive cycle, where $T_{ON}+T_{OFF}=T$. In the operation mode shown in FIG. 2, the controller 3 switches on the electronic switch 22 by generating an on-level of the drive signal $S_{DRV}$ at the beginning of each drive cycle. Referring to the above, the inductor current $I_L$ increases when the electronic switch 22 is in the on-state; the controller 3 switches off the electronic switch 22 when the inductor current $I_L$ represented by the inductor current signal $S_{IL}$ reaches a predefined threshold represented by the threshold signal $S_{TH}$. According to one example, the threshold signal $S_{TH}$ is a sawtooth signal that starts to decrease from a start level $S_{THStart}$ at the beginning of each drive cycle. According to one example, the start level $S_{THStart}$ and a slope $dS_{TH}/dt$ of the threshold signal $S_{TH}$ are dependent on the control signal $S_{CTRL}$. That is, $$S_{THStart} = T \cdot \frac{dS_{TH}}{dt} = f(S_{CTRL}), \qquad (1)$$

where $f(S_{CTRL})$ is a function of the control signal $S_{CTRL}$. This is explained in further detail with reference to an example below.

Figure 3:
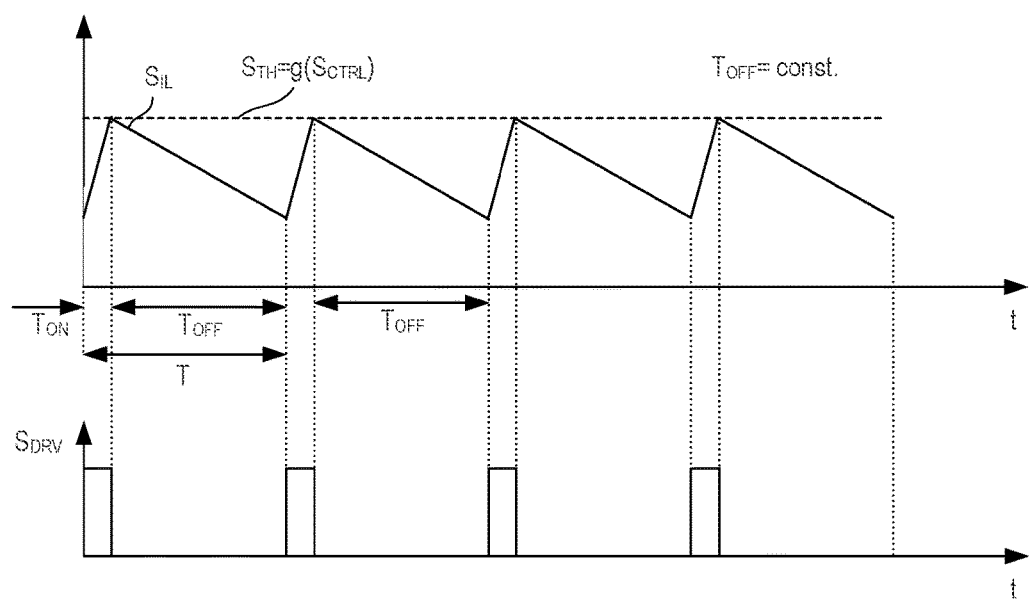
FIG. 3 shows timing diagrams that illustrate operation of the power converter circuit in a fixed off-time mode.

FIG. 3 shows timing diagrams of a peak current control according to another example. In particular, FIG. 3 shows timing diagrams of the inductor current signal $S_{IL}$, the threshold signal $S_{TH}$, and the drive signal $S_{DRV}$. In this example, like in the example shown in FIG. 2, the controller 3 switches off the electronic switch 22 by generating an off-level of the drive signal $S_{DRV}$ when the inductor current $I_L$ represented by the inductor current signal $S_{IL}$ reaches a predefined threshold represented by the threshold signal $S_{TH}$. In this method, a duration $T_{OFF}$ of the off-periods in the individual drive cycles is constant (fixed) so that a duration T of the individual drive cycles, which is given by the duration $T_{ON}$ of the on-period plus the duration $T_{OFF}$ of the corresponding off-period, $T=T_{ON}+T_{OFF}$ may vary dependent on the duration $T_{ON}$ of the on-period. This type of operation mode where the duration $T_{OFF}$ of the off-period is fixed is referred to as fixed off-time mode in the following. A signal level of the threshold signal $S_{TH}$ may be dependent on the control signal $S_{CTRL}$ in this operation mode, that is, $$S_{TH}=g(S_{CTRL}) \quad (2),$$

where $g(S_{CTRL})$ is a function of the control signal $S_{CTRL}$.

Each of FIGS. 2 and 3 illustrates an operation of the power converter circuit in a continuous conduction mode (CCM). In this operation mode, the inductor current $I_L$ and, therefore, the inductor current signal $S_{IL}$ has a triangular signal waveform, whereas the current $I_L$ does not decrease to zero.

A duty cycle d of the drive signals $S_{DRV}$ shown in FIGS. 2 and 3 is given by the duration $T_{ON}$ of the on-time divided by the overall duration T of one drive cycle, that is, $d=T_{ON}/T$. The duty cycle may vary in both operation modes in order to regulate the at least one operation parameter of the power converter circuit represented by the control signal $S_{CTRL}$.

The timing diagrams shown in FIGS. 2 and 3 illustrate an operation of the power converter circuit in a steady state. In the steady state, the average inductor current $I_L$ is substantially constant, wherein the average inductor current is given by the integral of the inductor current $I_L$ in one drive cycle divided by the duration of the drive cycle. In the steady state, the durations $T_{ON}$ of the on-periods are substantially equal in a plurality of successive drive cycles. Any increase of the durations of the on-periods results in an increase of the average inductor current, and any decrease of the durations of the on-periods results in a decrease of the average inductor current $I_L$. Such increase or decrease may result from an increase or decrease of the signal level of the feedback signal $S_{FB}$ explained with reference to FIGS. 4 and 5.

The power converter circuit is in the steady state if the current level of the inductor current $I_L$ at the beginning of one drive cycle equals the current level of the inductor current at the end of the respective drive cycle. That is, an increase of the inductor current $I_L$ during the on-period equals a decrease of the inductor current during the off-period. This can be expressed as follows:

$$m_{ON} \cdot T_{ON} = m_{OFF} \cdot T_{OFF} \quad (3),$$

where $m_{ON}$ denotes a slope of the inductor current $I_L$ during the on-period, $T_{ON}$ denotes the duration of the on-period, $m_{OFF}$ denotes the slope of the inductor current $I_L$ during the off-period, and $T_{OFF}$ denotes the duration of the off-period. In the following, $r=T_{OFF}/T_{ON}$ is referred to as off/on ratio and $d=T_{ON}/(T_{ON}+T_{OFF})=T_{ON}/T$ is referred to as duty cycle. In the steady state, the off/on ratio and the duty cycle d, respectively, can be expressed based on equation (3) as follows:

$$r = \frac{T_{OFF}}{T_{ON}} = \frac{m_{ON}}{m_{OFF}} \quad (4a)$$

$$d = \frac{T_{ON}}{T_{ON}+T_{OFF}} = \frac{T_{ON}}{T_{ON}+\frac{m_{ON}}{m_{OFF}}T_{ON}} = \frac{m_{OFF}}{m_{ON}+m_{OFF}}. \quad (4b)$$

The slopes $m_{ON}$ and $m_{OFF}$ and, therefore, the off/on ratio r and the duty cycle d in the steady state, are dependent on the input voltage $V_{IN}$ and the output voltage $V_{OUT}$. How these slopes $m_{ON}$ and $m_{OFF}$ are dependent on the input voltage $V_{IN}$ and the output voltage $V_{OUT}$ is dependent on the specific topology of the power converter circuit, where this topology is defined by the topology of the inductor and rectifier circuit 2. Some examples of possible topologies are explained with reference to FIGS. 4 to 8 below. In these figures, only the inductor and rectifier circuit 2 is shown, the controller 3 that generates the drive signal $S_{DRV}$ and the feedback circuit 4 are not shown. The slopes $m_{ON}$, $m_{OFF}$ associated with the topology shown in one figure are indicated next to the circuit diagram in the respective figure.

Figure 4:
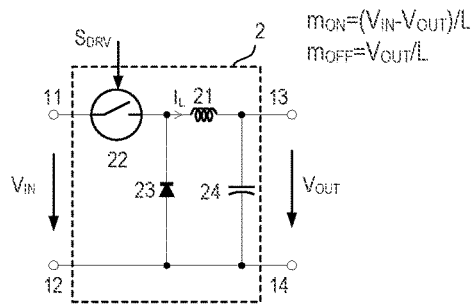
FIGS. 4 to 8 illustrate various types of power converter circuit topologies.

FIG. 4 illustrates a power converter circuit 2 with a buck converter topology. In this case, a series circuit with the electronic switch 22, the inductor 21 and the capacitor 24 of the rectifier circuit is connected between the first input node ii and the second input node 12. The output voltage $V_{OUT}$ is available across the capacitor 24 that is connected between the first output node 13 and the second output node 14, whereas the second input node 12 and the second output node 14 are formed by the same circuit node. The rectifier element 23 is connected in parallel with a series circuit including the inductor 21 and the capacitor 24. The slope $m_{ON}$ of the inductor current $I_L$ during the on-period is given by a voltage across the inductor 21 divided by an inductance L of the inductor 21. During the on-period, the voltage across the inductor 21 is given by the input voltage $V_{IN}$ minus the output voltage $V_{OUT}$ (whereas a voltage level of the input voltage $V_{IN}$ is higher than the voltage level of the output voltage $V_{OUT}$), so that the slope $m_{ON}$ during the on-period is given by $(V_{IN}-V_{OUT})/L$. During the off-period, the voltage across the inductor 21 substantially equals the output voltage $V_{OUT}$, so that the slope $m_{OFF}$ is given by the output voltage $V_{OUT}$ divided by the inductance L, $m_{OFF}=V_{OUT}/L$.

Figure 5:
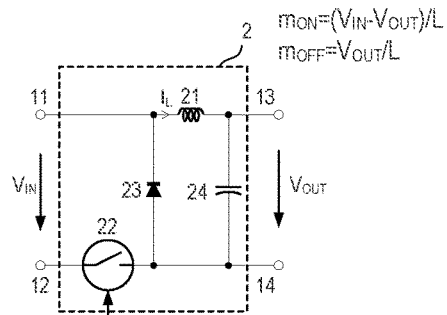

FIG. 5 shows a modification of the buck converter topology shown in FIG. 4. While in the circuit shown in FIG. 4, the electronic switch 22 is connected between the first input node ii and the inductor 21, the electronic switch 22 in the topology shown in FIG. 5 is connected between the capacitor 24 and the second output node 12. This topology may be referred to as floating buck converter topology. The slopes $m_{ON}$, $m_{OFF}$ and the operating principle of the buck converter shown in FIG. 5 correspond to the slopes $m_{ON}$, $m_{OFF}$ and the operating principle, respectively, of the buck converter shown in FIG. 4.

Figure 6:
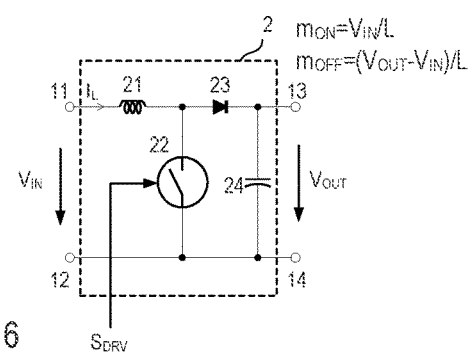

FIG. 6 shows an example of a power converter circuit with a boost converter topology. In this topology, a series circuit with the inductor 21 and the electronic switch 22 is connected between the first input node ii and the second input node 12. A series circuit with the rectifier element 23 and the capacitor 24 of the rectifier circuit are connected in parallel with the electronic switch 22, whereas the output voltage $V_{OUT}$, like in the topologies shown in FIGS. 4 and 5, is available across the capacitor 24. The second input node 12 and the second output node 14 are formed by the same circuit node in this topology. During the on-period, that is, when the electronic switch 22 is switched on, a voltage across the inductor 21 substantially equals the input voltage $V_{IN}$, so that the slope $m_{ON}$ during the on-period is given by the input voltage $V_{IN}$ divided by the inductor L, $m_{ON}=V_{IN}/L$. During the off-period, that is, after the electronic switch 22 has been switched off, the voltage across the inductor 21 equals the output voltage $V_{OUT}$ minus the input voltage $V_{IN}$, so that the slope $m_{OFF}$ during the off-period is given by $(V_{OUT}-V_{IN})/L$. The output voltage $V_{OUT}$ has a higher voltage level than the input voltage $V_{IN}$ in the power converter circuit with the boost topology.

Figure 7:
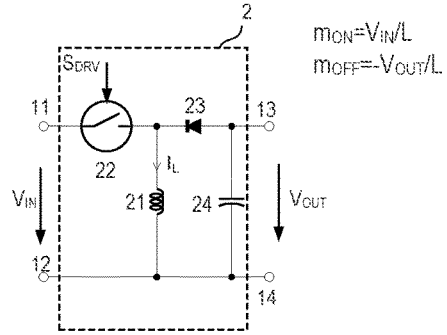

FIG. 7 shows an example of a power converter circuit with an inverting buck-boost topology. In this type of topology, a series circuit with the electronic switch 22 and the inductor 21 is connected between the first input node ii and the second input node 12. A series circuit with the rectifier element 22 and the capacitor 24 is connected in parallel with the inductor 21, whereas the output voltage $V_{OUT}$ is available across the capacitor 24. The input voltage $V_{IN}$ and the output voltage $V_{OUT}$ are referenced to the same circuit node that forms the second input node 12 and the second output node 14. The input voltage $V_{IN}$ and the output voltage $V_{OUT}$ have opposite polarities in the inverting buck-boost converter. During the on-period, that is, when the electronic switch 22 is switched on, the voltage across the inductor 21 substantially equals the input voltage $V_{IN}$, so that the slope $m_{ON}$ is given by the input voltage $V_{IN}$ divided by the inductance L of the inductor 21, $m_{ON}=V_{IN}/L$. During the off-period, the voltage across the inductor 21 substantially equals the negative output voltage $V_{OUT}$, so that the slope $m_{OFF}$ is given by $-V_{OUT}/L$.

Figure 8:
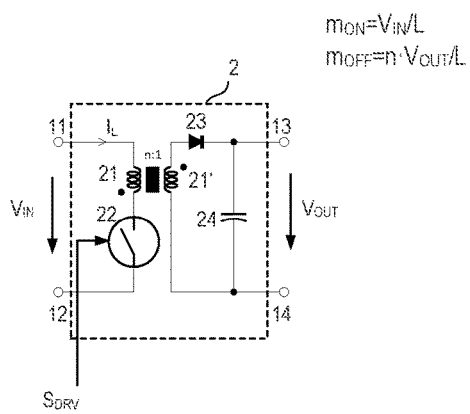

FIG. 8 shows one example of an inductor rectifier circuit 2 with a flyback converter topology. In this topology, the inductor 21 is a transformer with a primary winding $21_P$ and a secondary winding $21_S$. The primary winding 21P is connected in series with the electronic switch 22, whereas this series circuit is connected between the first input node ii and the second input node 12. A series circuit with the secondary winding $21_S$ and the rectifier element 23 is connected in parallel with the capacitor 24, whereas the capacitor 24 is connected between the first output node 13 and the second output node 14. The output voltage $V_{OUT}$ is available across the capacitor 24. The primary winding 21P and the secondary winding $21_S$ have opposite winding senses. A winding ratio between the number of turns of the primary winding 21P and the number of turns of the secondary winding $21_S$ is given by n:1, that is, the number of turns of the primary winding 21 is n times the number of turns of the secondary winding $21_S$. In the flyback converter topology, a current flows through the primary winding 21P during the on-period while by the current through the secondary winding $21_S$ is zero. During the off-period, the current through the primary winding 21P is zero and a current flows through the secondary winding. The current through the primary winding increases during the on-period, and the current through the secondary winding $21_S$ decreases during the off-period. A slope $m_{ON}$ of the current through the primary winding during the on-period is given by the input voltage $V_{IN}$ divided by the primary inductance L, which is the inductance of the primary winding 21. During the off-period, a slope $m_{OFF}$ of the current through the secondary winding is given by $n \cdot V_{OUT}/L$, where n defines the winding ratio.

In the drawings explained before, the electronic switch 22 is only schematically illustrated. Any type of electronic switch may be used to implement the electronic switch 22 in the power converter circuit. Examples of the electronic switch 22 include, but are not restricted to, a MOSFET (Metal Oxide Semiconductor Field-Effect Transistor), an IGBT (Insulated Gate Bipolar Transistor), a HEMT (High Electron Mobility Transistor), in particular a Gallium-Nitride-(GaN)-HEMT, a BJT (Bipolar Junction Transistor), or the like. The rectifier element 23 is drawn as a bipolar diode, which is a passive rectifier element, in the drawings explained before. This, however, is only an example. Any other type of passive rectifier element such as a Schottky diode may be used as well. Furthermore, the rectifier element is not restricted to be implemented as a passive rectifier element, so that an active rectifier element may be used instead. According to one example, an active rectifier element includes at least one electronic switch that may be switched on or off dependent on a polarity of a voltage across the at least one electronic switch. Those active rectifiers are often referred to as synchronous rectifiers (SR).

Figure 9:
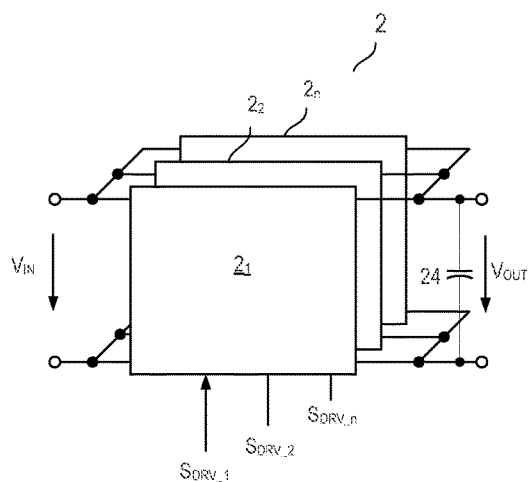
FIG. 9 schematically illustrates a power converter circuit with a plurality of converter stages that are connected in parallel between an input and an output.

The power converter circuits shown in FIGS. 4 to 8 include only one converter stage, that is only one inductor 21 and one capacitor 24. This, however, is only an example. According to another example, which is schematically illustrated in FIG. 9, the inductor rectifier circuit 2 includes several converter stages $2_1$, $2_2$, $2_n$ connected in parallel. "Connected in parallel" means that each of these converter stages $2_1$, $2_2$, $2_n$ is connected between the input 11, 12 and the output 13, 14. Each of these converter stages $2_1$, $2_2$, $2_n$ may be implemented in accordance with one of the topologies explained with reference to FIGS. 6 to 10. Each of these converter stages $2_1$, $2_2$, $2_n$ receives a respective drive signal $S_{DRV\_1}$, $S_{DRV\_2}$, $S_{DRV\_n}$. According to one example, the drive signals $S_{DRV\_1}$, $S_{DRV\_2}$, $S_{DRV\_n}$ are identical. According to another example, the drive signals $S_{DRV\_1}$, $S_{DRV\_2}$, $S_{DRV\_n}$ have the same duty cycle but there is a time shift between the individual drive signals $S_{DRV\_1}$, $S_{DRV\_2}$, $S_{DRV\_n}$ in order to operate the individual converter stages $2_1$, $2_2$, $2_n$ in an interleaved fashion.

Referring to the above, each of the control schemes explained with reference to FIGS. 2 and 3 includes comparing a current $I_L$ through the inductor 21 with a threshold signal $S_{TH}$, wherein the current through the inductor is represented by the inductor current signal $S_{IL}$ in the timing diagrams shown in FIGS. 2 and 3. Generating the inductor current signal $S_{IL}$ may include measuring the inductor current $I_L$. Due to parasitic effects, the inductor current $I_L$ may oscillate for a certain time period after the electronic switch 22 has been switched on. During those oscillations, the inductor current signal $S_{IL}$ may reach the threshold signal $S_{TH}$ which may result in an unintended switching off of the electronic switch 22 and, therefore, an on-period that is too short to meet the power consumption of the load Z. According to one example, the control circuit 3 is configured to blank out those oscillations in that it ignores the inductor current signal $S_{IL}$ in the generation of the drive signal for a time duration $T_{ON\_MIN}$ that is referred to as minimum on-time in the following. In other words, once the electronic switch 22 has been switched on it is maintained in the on-state at least for the minimum on-time $T_{ON\_MIN}$ even if the inductor current signal reaches the threshold signal $S_{TH}$ during the minimum on-time $T_{ON\_MIN}$. Comparing the inductor current signal $S_{IL}$ with the threshold signal and generating an off-level of the drive signal $S_{DRV}$ by the controller 3 based on this comparison begins after the minimum on-time $T_{ON\_MIN}$.

However, maintaining the electronic switch 22 in the on-state for the minimum duration $T_{ON\_MIN}$ may result in an undesired increase of the average inductor current $I_L$ if the power converter circuit is in an operation state in which the on-period as defined by the inductor current signal $S_{IL}$ and the threshold signal $S_{TH}$ is shorter than the minimum duration $T_{ON\_MIN}$. This operation state may occur if a power consumption of the load is very low so that discontinuous conduction mode takes place and on-times shorter than $T_{ON\_MIN}$ are sufficient to cover the power consumption of the load Z. According to one example, "very low" means less than 10% of a maximum output power the power converter can provide. This operation state may also be referred to as light load state. However, an increase of the inductor current $I_L$ if the electronic switch 22 is maintained in the on-state for the minimum duration $T_{ON\_MIN}$ is not restricted to a light load state but may also occur in any load state where continuous conduction mode takes place including full load and peak load. In continuous conduction mode the on-time is not a function of the load Z but a function only of the input voltage $V_{IN}$ and the output voltage $V_{OUT}$. Such a continuous conduction mode operation at normal load, full load, or peak load may result in that on-times shorter than $T_{ON\_MIN}$ are sufficient to cover the power consumption of the load Z if the input voltage $V_{IN}$ has a high voltage level.

Figure 10:
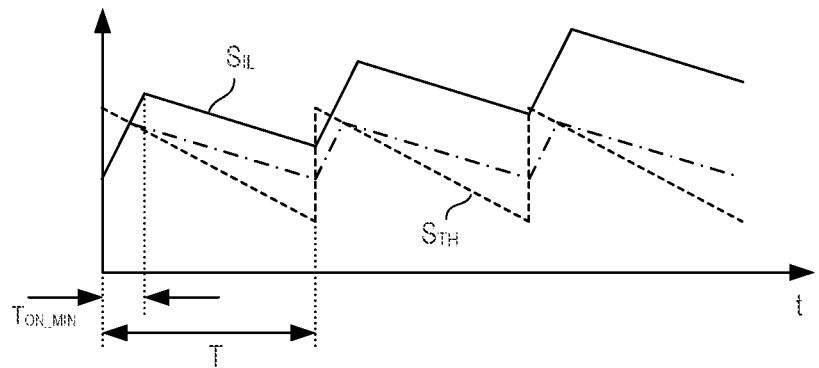
FIGS. 10 and 11 show timing diagrams that illustrate an undesired increase of an inductor current in case of a minimum on-time control.

An undesired increase of the inductor $I_L$ current as a result of maintaining the electronic switch 22 in the on-state for the minimum duration $T_{ON\_MIN}$ is illustrated in FIG. 10 for a power converter circuit operated with a fixed frequency control and in Figure ii for a power converter circuit operated with fixed off-time control. Each of these figures, in dashed and dotted lines, shows the timing diagram of the inductor current signal $S_{IL}$ of a power converter circuit that is in the steady state and does not include a minimum on-time control. Furthermore, these dashed and dotted lines represent operation scenarios in which the on-times based on the inductor current signal $S_{IL}$ and the threshold signal $S_{TH}$, that is, based on the power consumption of the load are shorter than the minimum on-time $T_{ON\_MIN}$.

Figure 11:
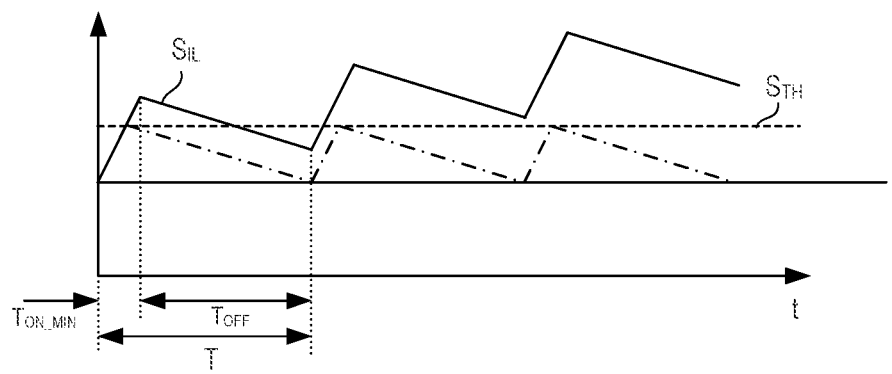

The solid lines in FIGS. 10 and 11 show timing diagrams of the inductor current signal $S_{IL}$ in a power converter circuit that is operated under the same operation conditions underlying the dashed and dotted lines, but that includes a minimum on-time control, which maintains the electronic switch 22 in the on-state at least for the minimum on-time $T_{ON\_MIN}$. As can be seen from FIGS. 10 and 11, the minimum on-time control may result in an undesired increase of the average inductor current $I_L$, which is represented by the inductor current signal $S_{IL}$ in FIGS. 10 and 11. This is due to the fact that the input power caused by the minimum on-time control is higher than the power consumption required by the load Z. In order to cover the power consumption required by the load shorter on-times, that is, on-times as represented by the dashed and dotted lines would be sufficient.

In order to prevent such undesirable increase of the average inductor current $I_L$, the controller is configured to operate the power converter circuit in one of a first operation mode and a second operation, wherein the drive parameter is predefined in the first operation mode, and wherein the drive parameter is adapted in the second operation mode such that a duration of the on-time is above a predefined duration threshold. This predefined duration threshold is the minimum on-duration $T_{ON\_MIN}$ according to one example, and greater than the minimum on-duration $T_{ON\_MIN}$ according to another example. The drive parameter being predefined in the first operation mode may include that the drive parameter is fixed or that the drive parameter varies in accordance with a predefined variation scheme. Referring to the above, the drive parameter is one of the drive cycle duration T or the off-time duration $T_{OFF}$. Each of these parameters affects the switching frequency, wherein varying these parameters in accordance with a predefined variation scheme may shape a frequency spectrum of electromagnetic emissions associated with the switched mode operation of the power converter circuit. In the following, "predefined" in context with the drive parameter therefore includes a fixed drive parameter or a drive parameter varying in accordance with a predefined (modulation) scheme. Varying the drive parameter in accordance with a predefined variation scheme may include periodically varying the drive parameter between a minimum value and a maximum value.

In the second operation mode, the drive parameter is adapted dependent on an operation state of the power converter. That is, the drive parameter is adapted when the power converter is in an operation state in which the inductor current $I_L$, more particularly, the average inductor current, would increase if the power converter would be operated based on the predefined drive parameter. This operation state is referred to as critical state in the following. According to one example, the controller 3 is configured to monitor the operation state of the power converter in order to detect the critical state and, upon detecting the critical state, to operate the power converter in the second operation mode. One example of this is illustrated in FIG. 12.

Figure 12:
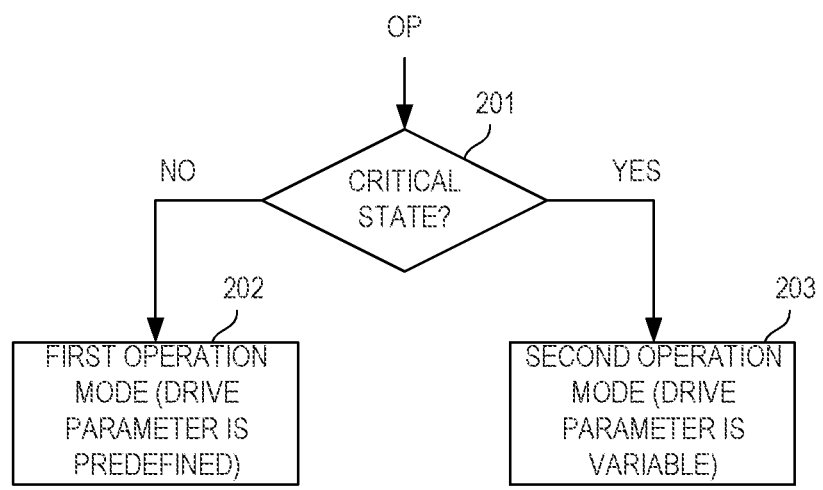
FIG. 12 shows a flowchart that illustrates a method for operating the power converter circuit in order to avoid an undesired increase of the inductor current.

FIG. 12 shows a flowchart of one way of operation of the controller 3. According to FIG. 12, the controller 3 is configured to monitor the operation state of the power converter circuit in order to detect the critical operation state, which is referred to as critical state in the following. Monitoring the operation state may include monitoring at least one operation parameter OP of the power converter circuit. Examples of the at least one operation parameter are explained below. According to one example, the controller 3 is configured to operate the power converter circuit in the first operation mode if the power converter circuit is not in the critical state (202), and the second operation mode if the power converter circuit is in the critical state (203). In the first operation mode, the controller 3 operates the power converter circuit based on a predefined drive parameter DP. According to one example, the drive parameter DP is the duration T of one drive cycle or the switching frequency, respectively. According to another example, the drive parameter is the duration $T_{OFF}$ of the off-time.

In the following "frequency control" denotes a type of control where the drive cycle duration T and, therefore, the frequency f=1/T of the drive cycles is controlled by the controller 3. Frequency control includes a predefined frequency control when the power converter circuit is in the first operation mode and a variable frequency control when the power converter circuit is in the second operation mode (in the critical state). Equivalently, "off-time control" denotes a type of control where the duration $T_{OFF}$ of the off-time in each drive cycle is controlled by the controller 3. Off-time control includes a predefined off-time control when the power converter circuit is in the first operation mode and a variable off-time control when the power converter circuit is in the second operation mode (in the critical state).

In the second operation mode, the controller 3 is configured to adapt the drive parameter such that a duration of the on-period is on or above a predefined duration threshold. This threshold is referred to as $T_{ON\_REF}$ in the following. According to one example, this threshold equals the duration $T_{ON\_MIN}$ of the minimum on-time. According to another example, $T_{ON\_REF}$ is longer than $T_{ON\_MIN}$. In other words, in the critical state, the power converter circuit is operated in an operation mode (the second operation mode) in which the drive parameter DP is changed such that the on-period is equal to or longer than the minimum on-time $T_{ON\_MIN}$ so that an undesirable increase of the average inductor current $I_L$ as illustrated in FIGS. 10 and 11 does not occur. Examples of the at least one operation parameter and of how the controller 3 may detect the critical state based on the at least one operation parameter are explained in further detail below.

In the following, $T_{NOM}$ denotes the duration of one drive cycle in a power converter circuit operated with a frequency control in the first operation mode. This operation mode is also referred to as nominal frequency mode in the following, and $T_{NOM}$ is referred to as nominal drive cycle duration. $T_{OFF\_NOM}$ denotes the off-time in a power converter circuit operated with an off-time control in the first operation mode.

This operation mode is also referred to as nominal off-time mode in the following, and $T_{OFF\_NOM}$ is referred to as nominal off-time duration. The nominal drive cycle duration $T_{OFF\_NOM}$ and the nominal off-time duration $T_{OFF\_NOM}$ may be fixed or may vary in accordance with a predefined variation scheme in order to vary the switching frequency and, therefore, shape a frequency spectrum of electromagnetic emissions associated with the switched mode operation of the power converter circuit.

Referring to FIGS. 10 and 11 and the corresponding description, the power converter circuit is in the critical state if the minimum on-time $T_{ON\_MIN}$ is longer than the on-time $T_{ON}$ that would be generated based on the control signal $S_{CTRL}$ and the input current signal $S_{IL}$ if the drive parameter were fixed to $T_{NOM}$ or $T_{OFF\_NOM}$, respectively. That is, the power converter circuit is in the critical state if $T_{ON\_MIN} > T_{ON}$, where $T_{ON}$ is the duration of the on-time that would be generated only based on the power consumption of the load, that is, absent the minimum on-time control.

Based on equations (3), (4a) and (4b) the duration $T_{ON}$ of the on-time in the steady state can be expressed either as $$T_{ON} = \frac{m_{OFF}}{m_{ON}} \cdot T_{OFF} = \frac{T_{OFF}}{r}, \quad (5a)$$

or $$T_{ON} = \frac{m_{OFF}}{m_{ON} + m_{OFF}} \cdot T = d \cdot T, \quad (5b)$$

where $T = T_{ON} + T_{OFF}$. Based on equations (5a) and (5b) it can be shown that a power converter circuit operated with an off-time control is in the critical state if $$T_{ON\_MIN} > \frac{m_{OFF}}{m_{ON}} \cdot T_{OFF\_NOM}. \quad (6a)$$

Equivalently, a power converter circuit with a frequency control is in the critical state if $$T_{ON\_MIN} > \frac{m_{OFF}}{m_{ON} + M_{OFF}} \cdot T_{NOM}. \quad (6b)$$

Based on equation (6a), a power converter circuit with off-time control is in the critical operation state if, $$\frac{T_{OFF\_NOM}}{T_{ON\_MIN}} < \frac{m_{ON}}{m_{OFF}} \text{ or } \frac{T_{OFF\_NOM}}{T_{ON\_MIN}}, \quad (7a)$$

and based on equation (6b), a power converter circuit with frequency control is in the critical operation state if, $$\frac{T_{NOM}}{T_{ON\_MIN}} < \frac{m_{ON} + m_{OFF}}{m_{OFF}} \text{ or } \frac{T_{NOM}}{T_{ON\_MIN}} < \frac{1}{d}. \quad (7b)$$

From equations (7a) and (7b) it can be seen that the critical state may be detected based on a ratio $m_{ON}/m_{OFF}$ between the slope $m_{ON}$ during the on-period and $m_{OFF}$ during the off-period. Referring to FIGS. 4 to 8, these slopes $m_{ON}$, $m_{OFF}$ are dependent on the input voltage $V_{IN}$ and the output voltage $V_{OUT}$. A power converter circuit with a buck topology as shown in FIG. 4 and operated with an off-time control, for example, is in the critical state if the following applies:

$$\frac{T_{OFF\_NOM}}{T_{ON\_MIN}} < \frac{V_{IN}}{V_{OUT}} - 1 \text{ or } V_{IN} > \frac{T_{OFF\_NOM} \cdot V_{OUT}}{T_{ON\_MIN}} + 1. \quad (8a)$$

A power converter circuit with a buck topology as shown in FIG. 6 and operated with an off-time control, for example, is in the critical state if the following applies:

$$\frac{T_{NOM}}{T_{ON\_MIN}} < \frac{V_{IN}}{V_{OUT}} \text{ or } V_{IN} > \frac{T_{NOM} \cdot V_{OUT}}{T_{ON\_MIN}}. \quad (8b)$$

Referring to equations (8a) and (8b) a buck converter is in the critical state if the input voltage is higher than a threshold voltage that is dependent on the output voltage $V_{OUT}$, the duration $T_{ON\_MIN}$ of the minimum on-time, the duration of the off-time $T_{OFF\_NOM}$ in the fixed off-time mode, and the duration $T_{NOM}$ of the individual drive cycles in the fixed frequency mode. Based on equations (6a) and (6b) it can be shown that in each of the topologies explained with reference to FIGS. 4 to 8 the power converter circuit is in the critical mode if the input voltage $V_{IN}$ is higher than a certain threshold voltage. In a power converter circuit with off-time control this threshold is dependent on the duration $T_{OFF\_NOM}$ of the off-time in the fixed off-time mode, the output voltage $V_{OUT}$ and the duration of the minimum on-time $T_{ON\_MIN}$, so that the power converter circuit is in the critical state if $$V_{IN} > V_{IN\_TH\_OTC}(T_{OFF\_NOM}, V_{OUT}, T_{ON\_MIN}) \quad (9a),$$

where $V_{IN\_TH\_OTC}(T_{OFF\_NOM}, V_{OUT}, T_{ON\_MIN})$ denotes a threshold dependent on $T_{OFF\_NOM}$, $V_{OUT}$ and $T_{ON\_MIN}$. This threshold is briefly referred to as $V_{IN\_TH\_OTC}$ in the following. In a power converter circuit with frequency control this threshold is dependent on the duration $T_{NOM}$ of the drive cycles in the fixed frequency mode, the output voltage $V_{OUT}$ and the duration $T_{ON\_MIN}$ of the minimum on-time, so that the power converter circuit is in the critical state if $$V_{IN} > V_{IN\_TH\_FC}(T_{NOM}, V_{OUT}, T_{ON\_MIN}) \quad (9b),$$

where $V_{IN\_TH\_FC}(T_{OFF\_NOM}, V_{OUT}, T_{ON\_MIN})$ denotes a threshold dependent on $T_{NOM}$, $V_{OUT}$ and $T_{ON\_MIN}$. This threshold is briefly referred to as $V_{IN\_TH\_FC}$ in the following.

Figure 13:
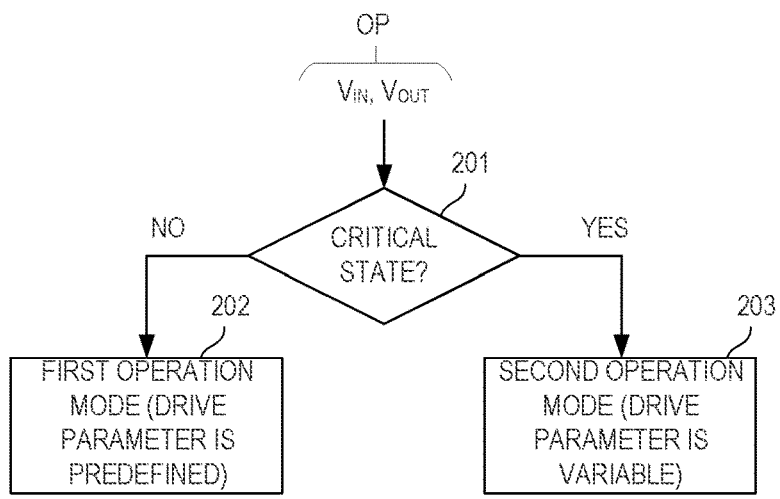
FIGS. 13 to 17 show various examples of the method illustrated in FIG. 12.

According to one example shown in FIG. 13, the at least one operation parameter OP includes the input voltage $V_{IN}$ and the output voltage $V_{OUT}$ and the operation mode controller 40 is configured to detect the critical state based on one of equations (7a) and (9a) in a power converter circuit with off-time control and based on one of equations (7b) and (9b) in a power converter circuit with frequency control, whereas $m_{ON}$ and $m_{OFF}$ are dependent on $V_{IN}$ and $V_{OUT}$ as explained above. The other parameters given in equations (7a) and (7b), that is, $T_{OFF\_NOM}$ and $T_{ON\_MIN}$ or even the ratio $T_{OFF\_NOM}/T_{ON\_MIN}$, are stored in the operation mode controller 40 according to one example. Signals that represent the input voltage $V_{IN}$ and the output voltage V and that are received by the controller in order to detect the critical state are not explicitly shown in FIG. 1.

Figure 14:
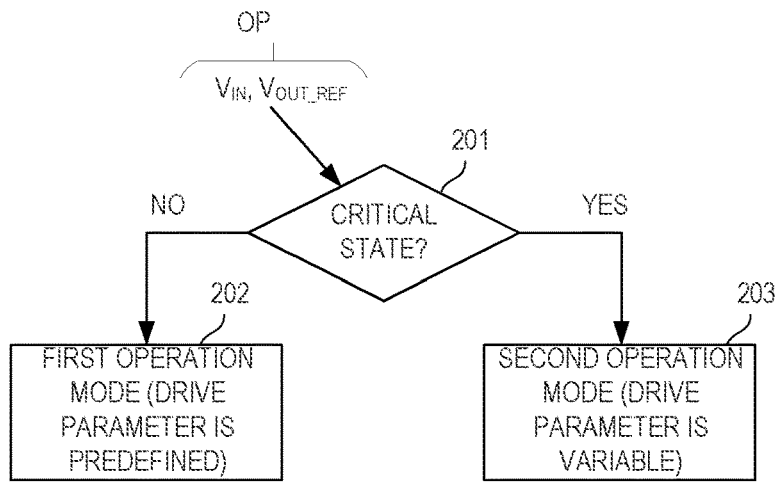

According to one example, the controller 3 is configured to regulate the output voltage $V_{OUT}$ such that a voltage level of the output voltage $V_{OUT}$ equals a voltage level of a set voltage $V_{OUT\_REF}$. Apart from transient phases that occur after a power consumption of the load Z has changed and in which the average input current adjusts to a new level the output voltage $V_{OUT}$ is therefore represented by the set voltage $V_{OUT\_REF}$. According to one example the controller 3 takes the decision whether or not the power converter circuit is in the critical state based on equation (7a) or (7b) (or (9a) or (9b)), whereas the output voltage $V_{OUT}$ is replaced by the set voltage $V_{OUT\_REF}$. A flowchart illustrating this way of operation of the controller 3 is shown in FIG. 14.

Figure 15:
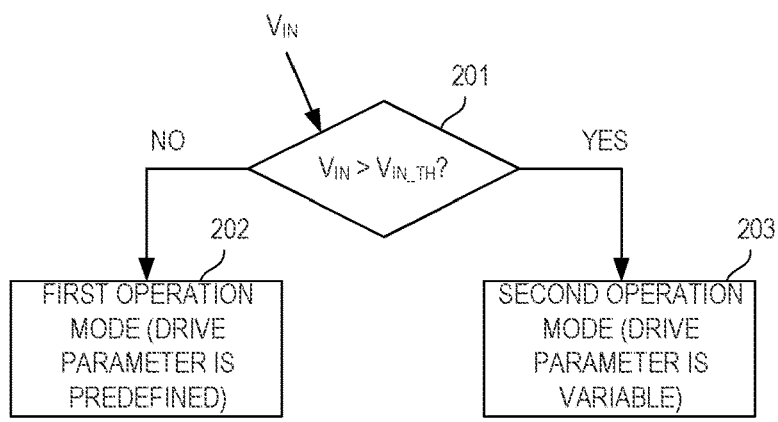

The controller 3 may receive a signal representing the set voltage $V_{OUT\_REF}$ as one operation parameter. Alternatively to receiving the signal representing the set voltage $V_{OUT\_REF}$ the set voltage $V_{OUT\_REF}$ is stored in the controller 3. In the latter case, the decision whether or not the power converter circuit is in the critical state may simply be based on comparing the input voltage $V_{IN}$ represented by the input voltage signal SATIN with one of the thresholds $V_{IN\_TH\_OTC}$ or $V_{IN\_TH\_FC}$. These thresholds which are only dependent on fixed parameters, if the output voltage $V_{OUT}$ is assumed to be substantially constant, can be stored in the controller 3. FIG. 15 shows a flowchart that illustrates this way of operation of the controller 3. Detecting the critical state simply includes comparing the input voltage $V_{IN}$ with a threshold $V_{IN\_TH}$, where $V_{IN\_TH}$ represents any of the thresholds $V_{IN\_TH\_OTC}$ or $V_{IN\_TH\_FC}$ explained above.

Figure 16:
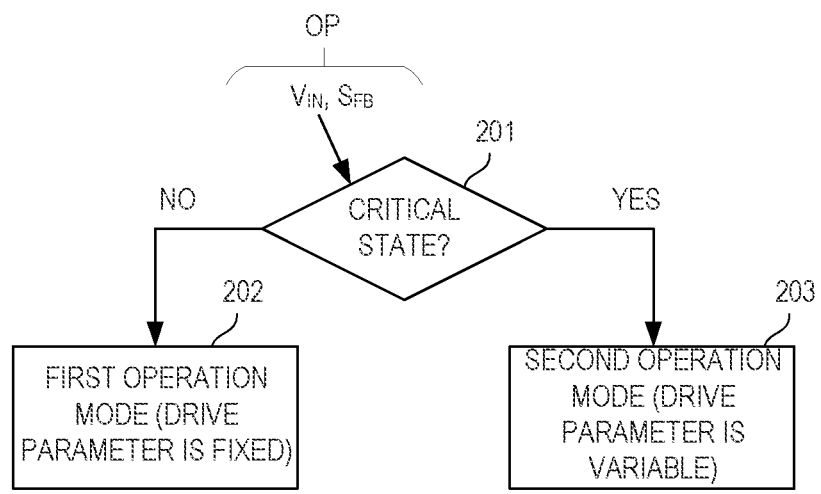

According to another example shown in FIG. 16, the controller 3 decides based on the input voltage signal $V_{IN}$ and the feedback signal $S_{FB}$ whether or not the power converter circuit is in the critical state. Based on the feedback signal $S_{FB}$ the controller receives the information on the output voltage $V_{OUT}$ required to take the decision based on equations (7a) and (7b) (or (9a) and (9b)).

Figure 17:
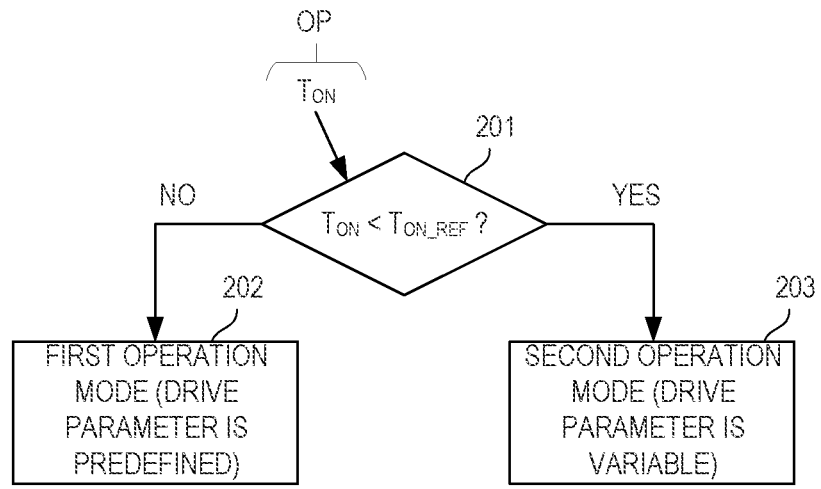

According to another example shown in FIG. 17, the operation parameter OP monitored by the controller 3 is the duration $T_{ON}$ of the on-time itself. The controller 3 may measure the information on the duration $T_{ON}$ of the on-time $T_{ON}$ for example using a counter (not shown) that is reset and starts to count each time the on-time starts and that stops to count when the on-time ends. A counter reading of the counter before it is reset represents the duration of the on-time. Of course other types of time measurement circuits may be used as well. Referring to FIG. 17, in order to detect the critical state, the controller 3 compares the duration $T_{ON}$ of the on-time with the on-time threshold $T_{ON\_REF}$ and starts to operate the power converter circuit in the second operation mode if the measured duration $T_{ON}$ of the on-time is shorter than the threshold $T_{ON\_REF}$.

Figure 18:
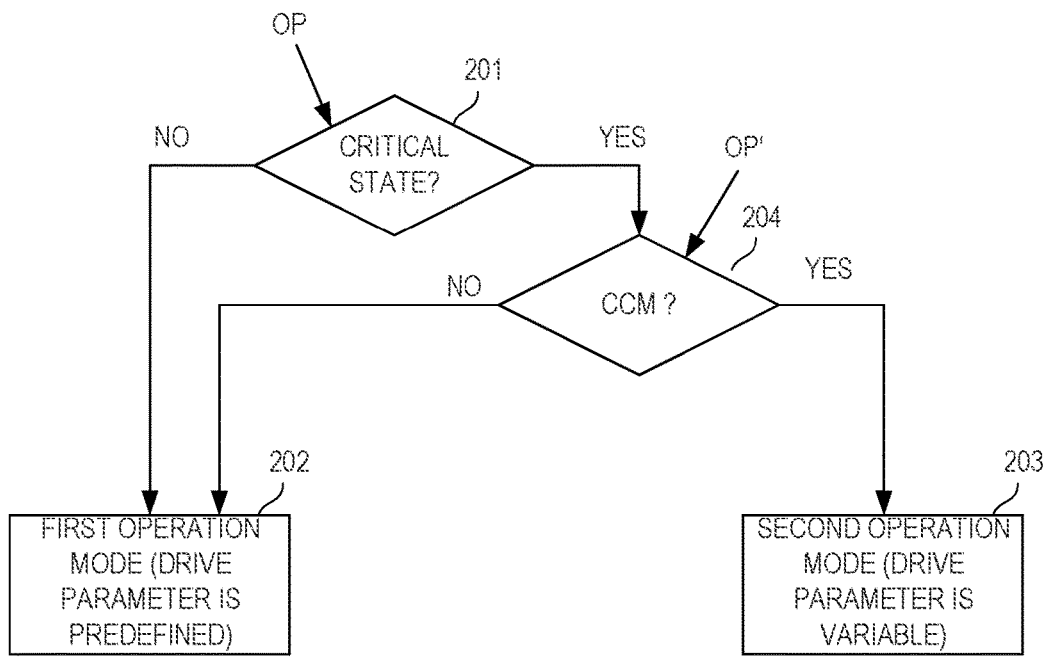
FIGS. 18 and 19 illustrate modifications of the method shown in FIG. 12.

According to one example, the controller 3 is further configured to detect whether the power converter circuit operates in the CCM (Continuous Conduction Mode) or the DCM (Discontinuous Conduction Mode) and, upon detecting that the power converter circuit is in the critical state, operates the power converter circuit in the second operation mode only if the power converter circuit is in the CCM. This is explained with reference to FIG. 18. FIG. 18 shows a flowchart that illustrates operation of the controller 3 in accordance with this example. Referring to FIG. 18, the controller 3, after having detected that power converter circuit is in the critical state, detects (204) whether or not the power converter circuit operates in the CCM. If the power converter circuit does not operates in the CCM the controller 3 causes the power converter circuit to (further) operate in the first operation mode. If the power converter circuit does operate in the CCM the controller 3 causes to power converter circuit to operate in the second operation mode.

Figure 19:
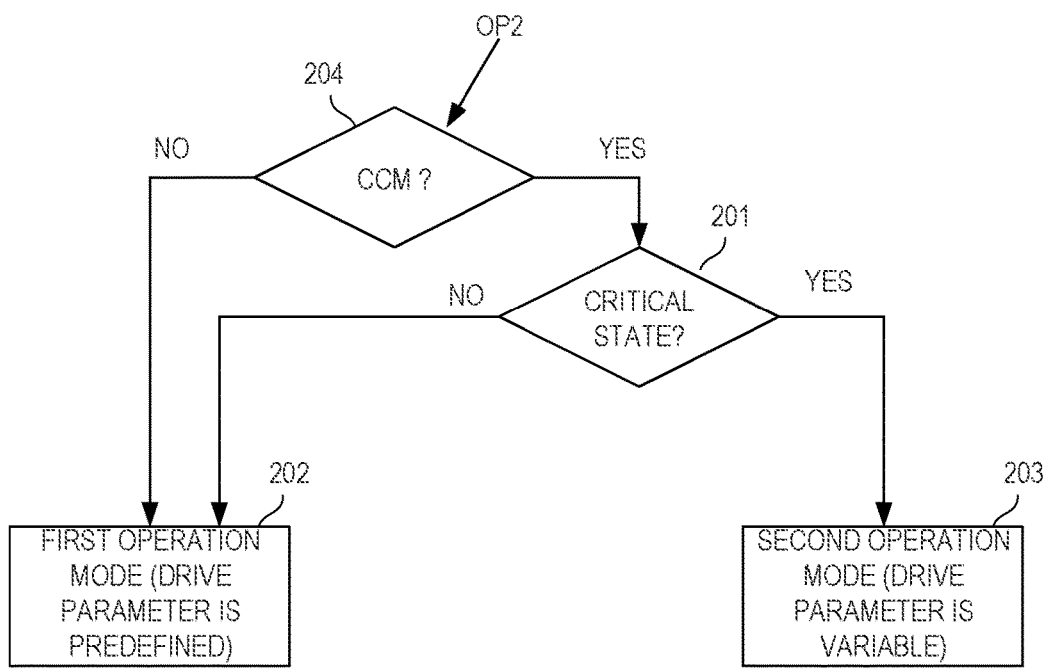

Alternatively, as shown in FIG. 19, the controller detects if the power converter circuit is in the CCM (201) and monitors if the power converter circuit is in the critical state only if the power converter circuit is in the CCM. The detection steps 201 and 204 shown in FIGS. 18 and 19 may be repeated regularly. According to one example, the controller 3 is configured to detect the operation state once in every drive cycle. According to another example, the controller 3 is configured to detect the operation state in accordance with a predefined timing scheme, that is, once in every period of a predefined duration.

In order to detect whether or not the power converter circuit is in the CCM (at 204 in FIGS. 18 and 19) the controller 3 may monitor at least one operation parameter OP'. This at least one operation parameter OP' may be the at least one operation parameter OP used to detect the critical state or may be different from this operation parameter OP. Referring to the above, the power converter circuit is in the CCM if the inductor current $I_L$ in the individual drive cycles does not reach zero. According to one example, the at least operation parameter OP' represents the inductor current $I_L$ and the controller 3 is configured to detect whether the inductor current $I_L$ reaches zero in the individual drive cycles. In some types of power converter circuits, such as a flyback converter, there may be a circuit that detects when the inductor 21 has been demagnetized. Such demagnetization of the inductor is equivalent to that the inductor current has reached zero. In those types of power converter circuits the controller may receive a signal that represents a magnetization state of the inductor in order to detect whether or not the power converter circuit is in the CCM. According to another example, the at least one operation parameter OP' monitored to the detect the CCM represents the feedback signal $S_{FB}$. Referring to the above, the feedback signal $S_{FB}$ represents the power consumption of the load Z. Furthermore, if the power consumption of the load Z is higher than a certain power threshold, the power converter circuit operates in the CCM. Thus, according to one example the controller 3 is configured to compare the feedback signal $S_{FB}$ with the power threshold and detects that the power converter circuit is in the CCM if the feedback signal $S_{FB}$ rises above the threshold.

In the critical state, the drive parameter DP, which may be either the duration T of the drive cycle or the duration $T_{OFF}$ of the off-time may be adjusted by the controller 3 in various way. Some examples of how the drive parameter may be adjusted are explained below. Referring to the above, in the critical state, the controller 3 adjusts the drive parameter such that the duration $T_{ON}$ of the on-time is on or above a predefined threshold $T_{ON\_REF}$, which may be equal to or longer than the duration $T_{ON\_MIN}$ of the minimum on-time.

According to one example, the controller 3, in the critical state, calculates the drive parameter DP based on the input voltage $V_{IN}$ and one of the output voltage $V_{OUT}$ and the set value $V_{OUT\_REF}$ of the output voltage. Based on these parameters the controller 3 may calculate a duration $T_{OFF\_CS}$ of the off-time in the critical state based on equation (3) as follows, in order to adjust the duration of the on-time to the duration $T_{ON\_REF}$:

$$T_{OFF\_CS} = \frac{m_{ON}}{m_{OFF}} \cdot T_{ON\_REF} = r \cdot T_{ON\_REF}, \qquad (10a)$$

where the information on the input voltage $V_{IN}$ and the output voltage $V_{OUT}$ is included in $m_{ON}$ and $m_{OFF}$ as explained above.

In the following, $r_{ON\_REF}$ denotes the off/on ratio and $d_{ON\_REF}$ denotes the duty cycle that are obtained when the duration of the on-time in the steady state in the first operation mode equals $T_{ON\_REF}$. The on/off ratio $r_{ON\_REF}$ can be expressed as $r_{ON\_REF} = T_{OFF\_NOM}/T_{ON\_REF}$ so that the duration $T_{OFF\_CS}$ may also be calculated based on, $$T_{OFF\_CS} = \frac{r}{r_{ON\_REF}} \cdot T_{OFF\_NOM}. \tag{11a}$$

The duration $T_{OFF\_CS}$ calculated in accordance with equations (boa) and (bob) and applied in the second operation mode is longer than $T_{OFF\_NOM}$ in the first operation mode. Equivalently the controller 3 may calculate a duration $T_{CS}$ of one drive cycle in the critical state based on equation (3) as follows, in order to adjust the duration of the on-time to the duration $T_{ON\_REF}$:

$$T_{CS} = \frac{m_{ON} + m_{OFF}}{m_{OFF}} \cdot T_{ON\_REF} = \frac{1}{d} \cdot T_{ON\_REF}, \tag{10b}$$

where the information on the input voltage $V_{IN}$ and the output voltage $V_{OUT}$ is included in $m_{ON}$ and $m_{OFF}$ as explained above. The ratio $d_{ON\_REF}$ explained above can be expressed as $d_{ON\_REF} = T_{ON\_REF}/T_{NOM}$ so that the duration $T_{CS}$ may also be calculated based on, $$T_{CS} = \frac{d_{ON\_REF}}{d} \cdot T_{NOM}. \tag{11b}$$

$r_{ON\_REF}$ and $d_{ON\_REF}$ are associated with the threshold voltages $V_{IN\_TH\_OTC}$ and $V_{IN\_TH\_FC}$ explained with reference to equations (9a) and (9b). That is, $r_{ON\_REF}$ is obtained in a power converter with off-time control if the input voltage $V_{IN}$ equals the threshold $V_{IN\_TH\_OTC}$, and $d_{ON\_REF}$ is obtained in a power converter with frequency control if the input voltage $V_{IN}$ equals the threshold $V_{IN\_TH\_FC}$. These thresholds can be calculated in the way explained with reference to equations (9a) and (9b).

According to one example, the controller 3 is configured to calculate the drive parameter DP, that is, the duration $T_{OFF}$ of the off-time or the duration T of one drive cycle based on equations (11a) and (11b) as follows:

$$T_{OFF} = T_{OFF\_NOM} \cdot \max\left\{1; \frac{r}{r_{ON_{REF}}}\right\} \tag{12a}$$

$$T = T_{NOM} \cdot \max\left\{1; \frac{d_{ON\_REF}}{d}\right\}, \tag{12b}$$

where max{a;b} denotes a mathematical function the result of which is the maximum of "a" and "b". In this example, detecting whether or not the power converter circuit is in the critical state and obtaining the drive parameter is done in a single process defined by one of equations (12a) and (12b). The controller 3 regularly calculates one of the terms $$\frac{r}{r_{ON_{REF}}} \text{ and } \frac{d_{ON\_REF}}{d}$$

based on the input voltage $V_{IN}$ and one of $V_{OUT}$ and $V_{OUT\_REF}$ whereas the power converter circuit is in the critical state and the respective term defines the drive parameter ($T_{OFF}$ or T) if the respective term is greater than 1. In this example, there is no explicit detection of the operation state, but the detection of the operation state is included in the selection within the max{a;b} operation, whereas the power converter is in the first operation mode if the first term (1 in equations (12a) and (12b)) is selected and in the second operation mode if the second term is selected.

Calculating one of equations (10a), (10b), (11a), (11b), (12a) and (12b) may include one or more divisions. In order to avoid those divisions, the controller 3 is configured to approximate one or more of these equations by a piecewise linear function. This is explained with reference to an example shown FIG. 20.

Figure 20:
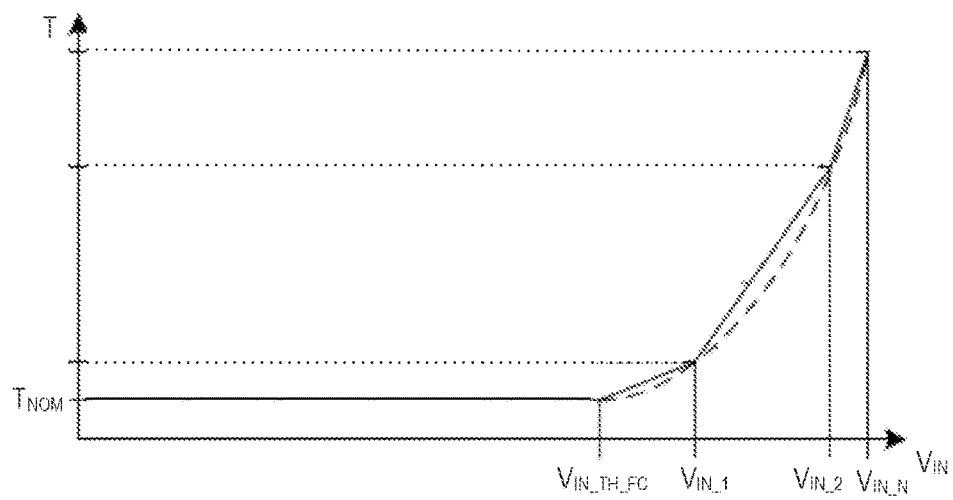
FIG. 20 illustrates obtaining a drive parameter of the power converter based on a piecewise linear function.

FIG. 20 illustrates the dependency of the drive parameter DP on an operation parameter when calculated in accordance with one of the equations explained herein above. Just for the purpose of illustration, the dashed line shown in FIG. 20 illustrates the drive cycle duration T dependent on the input voltage $V_{IN}$ that may be obtained based on equation (12b) if the power converter has a boost topology as shown in FIG. 6. The specific topology of the power converter affects $m_{ON}$ and $m_{OFF}$ which, in turn, affect $d_{ON\_REF}$ in equation (12b). However, the drive cycle duration T as drive parameter and the boost topology as topology of the power converter are only examples. What is explained with reference to FIG. 20 below applies to the off-time duration $T_{OFF}$ as a drive parameter and any other topology than a boost topology as well.

Referring to FIG. 20, the drive cycle duration T equals the nominal duration $T_{NOM}$ if the input voltage $V_{IN}$ is below the threshold $V_{IN\_TH\_FC}$. At input voltage levels higher than the threshold $V_{IN\_TH\_FC}$ the drive cycle duration T increases as the input voltage $V_{IN}$ increases. The dashed line in FIG. 20 illustrates the drive cycle duration T when calculated in accordance with $d_{ON\_REF}/d$ according to equation (12b).

The solid line in FIG. 20 illustrates a piecewise linear approximation of the curve shown in dashed lines. This piecewise linear curve can be expressed as, $$T = T_{NOM} \cdot (1 + a_0 \cdot \max\{0; V_{IN} - V_{IN\_TH\_FC}\} + a_1 \cdot \max\{0; V_{IN} - V_{IN\_1}\} + a_2 \cdot \max\{0; V_{IN} - V_{IN\_2}\} + \ldots + a_N \cdot \max\{0; V_{IN} - V_{IN\_N}\}) \tag{13},$$

where $a_0, \ldots, a_N$ denote coefficients that are selected based on the curve that is to be approximated, and $V_{IN\_1}, V_{IN\_2}, V_{IN\_N}$, where $V_{IN\_TH\_FC} < V_{IN\_1} < V_{IN\_2} < V_{IN\_N}$ define intervals, wherein T is linearly dependent on the input voltage $V_{IN}$ in each of these intervals. Just for the purpose of illustration, there are N=3 three intervals in the example shown in FIG. 20. According to one example, each of the coefficients $a_0, \ldots, a_N$ is greater than zero, that is, $a_i > 0$, where $i = 1, \ldots, N$. According to another example, at least one of the coefficients is negative so that the sum of the coefficients is zero, that is, $$\Sigma_{i=1}^{N} a_i = 0 \tag{14}.$$

According to another example, the controller 3 is configured to calculate the drive parameter based on the feedback signal $S_{FB}$. According to one example, the calculation of the drive parameter includes a piecewise linear approximation.

A piecewise linear approximation of the drive cycle duration, as one example of the drive parameter, may include a calculation as follows:

$$T = T_{NOM} \cdot (1 + b_0 \cdot \max\{0; S_{FB} - S_{FB\_TH\_FC}\} + b_1 \cdot \max\{0; S_{FB} - S_{FB\_1}\} + b_2 \cdot \max\{0; S_{FB} - S_{FB\_2}\} + \ldots + b_N \cdot \max\{0; S_{FB} - S_{FB\_N}\}) \quad (15),$$

where $b_0, \ldots b_N$ denote coefficients that are selected based on the curve that is to be approximated, and $S_{FB\_1}$, $S_{OUT\_2}$, $S_{FB\_N}$, where $S_{FB\_TH\_FC} < S_{FB\_1} < S_{FB\_2} < S_{FB\_N}$ define intervals, wherein T is linearly dependent on the feedback signal $S_{FB}$ in each of these intervals. According to one example, each of the coefficients $b_0, \ldots, b_N$ is greater than zero, that is, $b_i > 0$, where $i = 1, \ldots, N$. According to another example, at least one of the coefficients is negative so that the sum of the coefficients is zero. $S_{FB\_TH\_FC}$ denotes a threshold of the feedback signal $S_{FB}$ at which the power converter may enter the critical state. The power converter circuit may be in the critical state if the feedback signal $S_{FB}$ is below the threshold and is outside the critical state if the feedback signal $S_{FB}$ is above the threshold. The lower $S_{FB}$ the larger T may be chosen to keep the converter circuit out of the critical state. Examples of how the feedback signal $S_{FB}$ can be generated are explained with reference to FIGS. 25 and 26 below.

According to another example, the drive parameter is calculated based on the input voltage $V_{IN}$ and the feedback signal $S_{FB}$ as operation parameters. According to one example, calculating the drive parameter includes a piecewise linear approximation. A piecewise linear approximation of the drive cycle duration T, as one example of the drive parameter, may include a calculation as follows:

$$T = T_{NOM} \cdot [(1 + a_0 \cdot \max\{0; V_{IN} - V_{IN\_TH\_FC}\} + a_1 \cdot \max\{0; V_{IN} - V_{IN\_1}\} + a_2 \cdot \max\{0; V_{IN} - V_{IN\_2}\} + \ldots + a_N \cdot \max\{0; V_{IN} - V_{IN\_N}\}) + (1 + b_0 \cdot \max\{0; S_{FB} - S_{FB\_TH\_FC}\} + b_1 \cdot \max\{0; S_{FB} - S_{FB\_1}\} + b_2 \cdot \max\{0; S_{FB} - S_{FB\_2}\} + \ldots + b_N \cdot \max\{0; S_{FB} - S_{FB\_N}\}) \quad (16).$$

Figure 21:
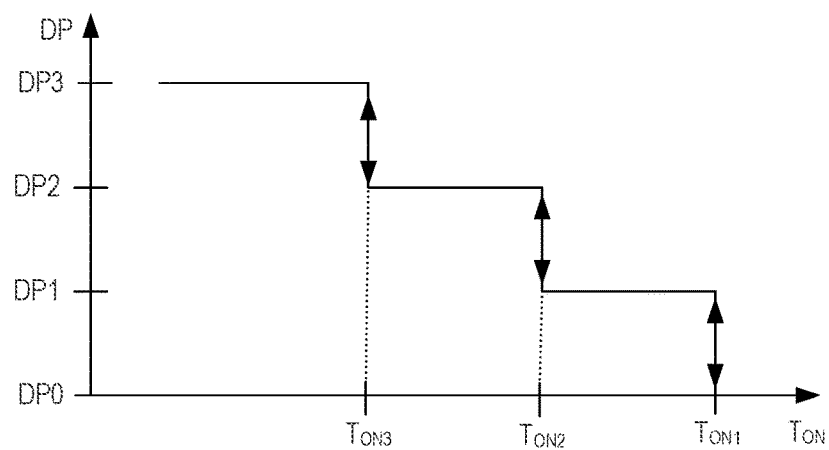
FIGS. 21 to 24 illustrate various examples of how a drive parameter of the power converter circuit may be adjusted in order to avoid an undesired increase of the inductor current.

According to another example, the controller selects one of a plurality of drive parameters based on the duration $T_{ON}$ of the on-time. A first example, of such decision based selection of the drive parameter DP is illustrated in FIG. 21. FIG. 21 illustrates the drive parameter DP selected by the controller 3 based on the duration $T_{ON}$ of the on-time, which is the monitored operation parameter OP in this example. Just for the purpose of explanation, FIG. 21 shows four different drive parameters DP0, DP1, DP2, DP3 and three different on-time thresholds $T_{ON1}$, $T_{ON1,2}$, $T_{ON3}$ whereas in each case two of these drive parameters are associated with one threshold. The controller 3, for example, selects a first drive parameter DP0 if the on-time is longer than $T_{ON}$, a second drive parameter DP1 if the on-time is shorter than $T_{ON}$, a third drive parameter DP2 if the on-time is shorter than $T_{ON2}$, and a fourth drive parameter DP3 if the on-time is shorter than $T_{ON3}$, where $T_{ON1} > T_{ON2} > T_{ON3}$. The drive parameter represents one of the duration $T_{OFF}$ of the off-time and the duration T of the drive cycle. According to one example, DP0 represents $T_{OFF\_NOM}$ and $T_{NOM}$, respectively. In the example shown in FIG. 21, there is no explicit detection of the critical state. In this example, the power converter enters the critical state if the duration of the on-time $T_{ON}$ falls below a first duration threshold $T_{ON1}$ and leaves the critical state if the on-time $T_{ON}$ rises above the first threshold $T_{ON1}$.

Figure 22:
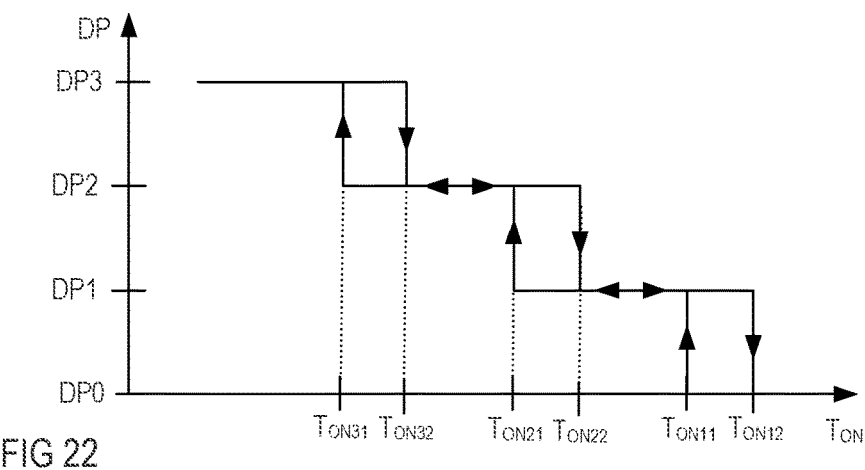

FIG. 22 illustrates a modification of the example shown in FIG. 22. In this example, the drive parameter changes in accordance with a hysteresis. The drive parameter DP changes from DP0 to DP1, for example, if the on-time falls below $T_{ON11}$, but changes back from DP1 to DP0 if the on-time rises above $T_{ON12}$, where $T_{ON12} > T_{ON11}$.

Figure 23:
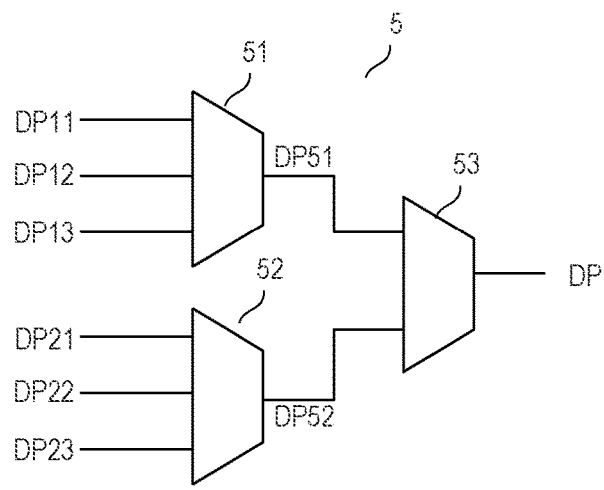

According to another example, the drive parameter is selected dependent on the on-time and at least one other parameter. This is explained with reference to FIG. 23. FIG. 23 illustrate a decision circuit that may be implemented in the controller 3. This circuit receives a first plurality (6 in this example) of different drive parameters DP11-DP23. From this first plurality of drive parameters a second plurality (2 in this example) of drive parameters is selected based on a first operation parameter. Based on a second operation parameter one drive parameter is selected from the second plurality. In this example, the first operation parameter is the on-time $T_{ON}$ and the second drive parameter is the feedback signal $S_{FB}$, whereas $D(T_{ON})$ denotes a decision based on $T_{ON}$ and $D(S_{FB})$ denotes a decision based on $S_{FB}$. Multiplexers 51, 52, 53 represent the selection process in the example shown in FIG. 23. A first multiplexer 51 receives a first group and a second multiplexer receives a second group of the first plurality of drive parameters, and each of these first and second multiplexers selects one of the drive parameters it receives based on the first operation parameter. The selection performed by each of the multiplexers based on the first operation parameter may be a selection in accordance with one of the curves shown in FIGS. 20 and 21. A third multiplexer 53 selects one drive parameter from the two drive parameters DP51, DP52 output by the first and second multiplexers 51, 52, respectively.

According to another example, the controller 3 is configured to iteratively change the drive parameter dependent on the duration $T_{ON}$ of the on-time. In an off-time controlled power converter, for example, the controller may adjust the duration $T_{OFF}$ of the off-time as follows:

$$T_{OFF}[i+1] = \frac{T_{ON\_REF}}{T_{ON}[i]} \cdot T_{OFF}[i], \quad (17a)$$

if $T_{ON}[i] < T_{ON\_REF}$, where $T_{ON}[i]$ and $T_{OFF}[i]$ denote the duration of the on-time and the off-time in one drive cycle i and $T_{OFF}[i+1]$ denotes the duration of the off-time in a subsequent drive cycle i+1, wherein the off-time is newly adjusted based on equation (17a) only if the on-time in drive cycle i is shorter than $T_{ON\_REF}$. In a frequency controlled power converter, for example, the controller may adjust the duration T of the drive cycle as follows:

$$T[i+1] = \frac{T_{ON\_REF}}{T_{ON}[i]} \cdot T[i], \quad (17b)$$

if $T_{ON}[i] < T_{ON\_REF}$, where $T_{ON}[i]$ and $T[i]$ denote the duration of the on-time and the drive cycle in one drive cycle i and $T[i+1]$ denotes the duration of the subsequent drive cycle i+1, wherein the duration T is newly adjusted based on equation (17b) only if the on-time in drive cycle i is shorter than $T_{ON\_REF}$. In this method, the converter circuit "automatically" enters the second operation mode when the on-time is shorter than $T_{ON\_REF}$.

According to another example, the controller 3 is configured to calculate the drive parameter DP, that is, the duration $T_{OFF}$ of the off-time or the duration T of the drive cycle in accordance with equations (17a) and (17b), in each drive cycle but limits $T_{OFF}$ to $T_{OFF\_NOM}$ and T to $T_{NOM}$:

$$T_{OFF}[i+1] = \max\left\{T_{OFF\_NOM}; \frac{T_{ON\_REF}}{T_{ON}[i]} \cdot T_{OFF}[i]\right\} \quad (18a)$$

$$T[i+1] = \max\left\{T_{NOM}; \frac{T_{ON\_REF}}{T_{ON}[i]} \cdot T[i]\right\}. \quad (18b)$$

In this example, the drive parameter ($T_{OFF}$ or T) increases as the duration $T_{ON}$ of the on-time decreases and decreases as the duration of the on-time increases. However, the drive parameter cannot decrease below $T_{OFF\_NOM}$ and $T_{ON\_NOM}$, respectively.

An increase of the drive parameter ($T_{OFF}$ or T) results in a decrease of the switching frequency. According to one example, the drive parameter ($T_{OFF}$ or T) is limited to a maximum value ($T_{OFF\_MAX}$ or $T_{MAX}$) in order to avoid the switching frequency from decreasing to a frequency range that may cause audible noise. In this example, the controller 3 may operate the power converter circuit in accordance with one of equations (15a) and (15b) below, which are based on equations (18a) and (18b).

$$T_{OFF}[i+1] = \max\left\{T_{OFF\_NOM}; \min\left\{T_{OFF_{MAX}}; \frac{T_{ON\_REF}}{T_{ON}[i]} \cdot T_{OFF}[i]\right\}\right\} \quad (19a)$$

$$T[i+1] = \max\left\{T_{NOM}; \min\left\{T_{MAX}; \frac{T_{ON\_REF}}{T_{ON}[i]} \cdot T[i]\right\}\right\}, \quad (19b)$$

where min{a;b} denotes a mathematical function the result of which is the minimum of "a" and "b".

According to another example, the controller is configured to adjust the drive parameter DP ($T_{OFF}$ or T) such that the on-time duration $T_{ON}$ is within a predefined range defined by $T_{ON\_REF}$ and $T_{ON\_MAX}$. The controller is configured to decrease the drive parameter if the on-time is longer than $T_{ON\_MAX}$ and increase the drive parameter DP if the on-time is shorter than $T_{ON\_REF}$. A flowchart that illustrates operation of the controller in accordance with this example is shown in FIG. 24.

Figure 24:
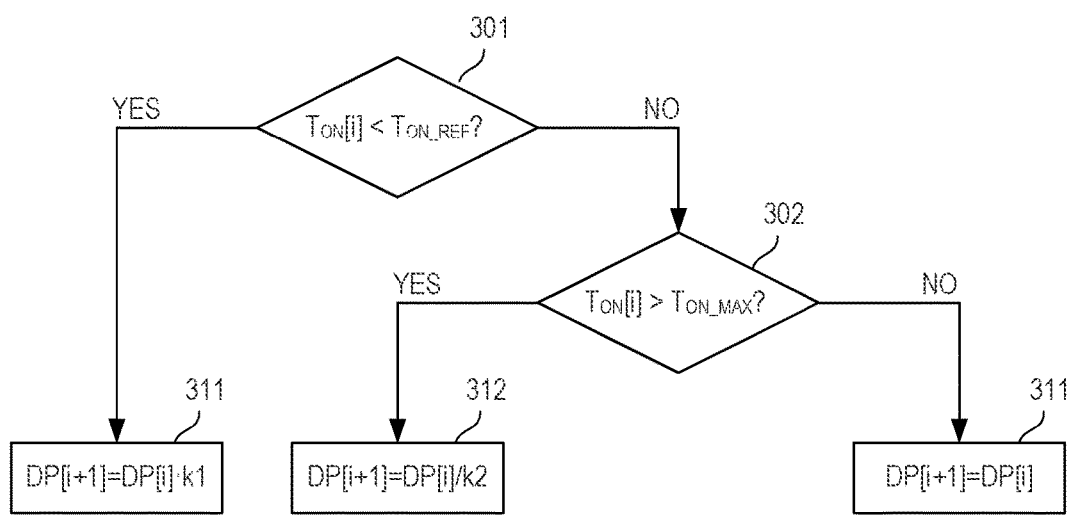

Referring to FIG. 24, the controller compares the on-time duration $T_{ON}[i]$ in one drive cycle i with the lower threshold $T_{ON\_REF}$ (301). If the on-time duration $T_{ON}[i]$ is smaller the lower threshold $T_{ON\_REF}$ the controller increases (311) the drive parameter DP[i+1] in the next drive cycle i+1 in accordance with $$DP[i+1]=DP[i]\cdot k1 \quad (20),$$

where k1 is a constant, with k1>1. According to one example, k1 is between 1 and 2. If the on-time duration $T_{ON}[i]$ is not below the lower threshold $T_{ON\_REF}$ the controller 3 compares the on-time duration $T_{ON}[i]$ with the upper threshold $T_{ON\_MAX}$ (302). If the on-time duration $T_{ON}[i]$ is greater than the upper threshold $T_{ON\_MAX}$ the controller decrease (312) the drive parameter DP[i+1] in the next drive cycle i+1 in accordance with $$DP[i+1]=DP[i]/k2 \quad (21),$$

where k2 is a constant, with k2>1. According to one example, k2 is between 1 and 2. According to one example, k2 is substantially the same as k1. If the $T_{ON}[i]$ is neither below the lower threshold $T_{ON\_REF}$ nor above the upper threshold $T_{ON\_MAX}$ the drive parameter is not changed (313), that is, DP[i+1]=DP[i].

According to one example, there is only one threshold, which is equivalent to that the lower threshold equals the upper threshold $T_{ON\_REF}=T_{ON\_MAX}$.

In the examples shown in FIGS. 23 and 24 there is no explicit detection of the critical state. The power converter enters the critical state when the duration of the on-time $T_{ON}$ falls below the threshold $T_{ON\_REF}$ so that the drive parameter DP changes from the nominal value ($T_{NOM}$, $T_{OFF\_NOM}$) to a higher value. The power converter leaves the critical state when the drive parameter has returned to the nominal value.

Figure 25:
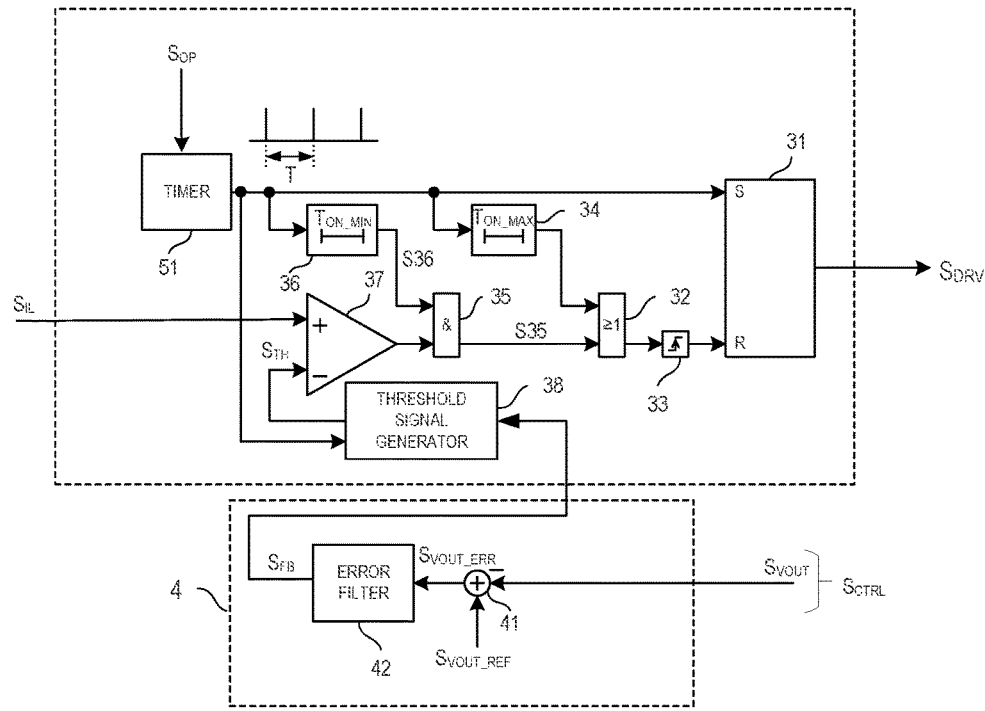
FIG. 25 shows one example of a controller shown in FIG. 1.
Figure 26:
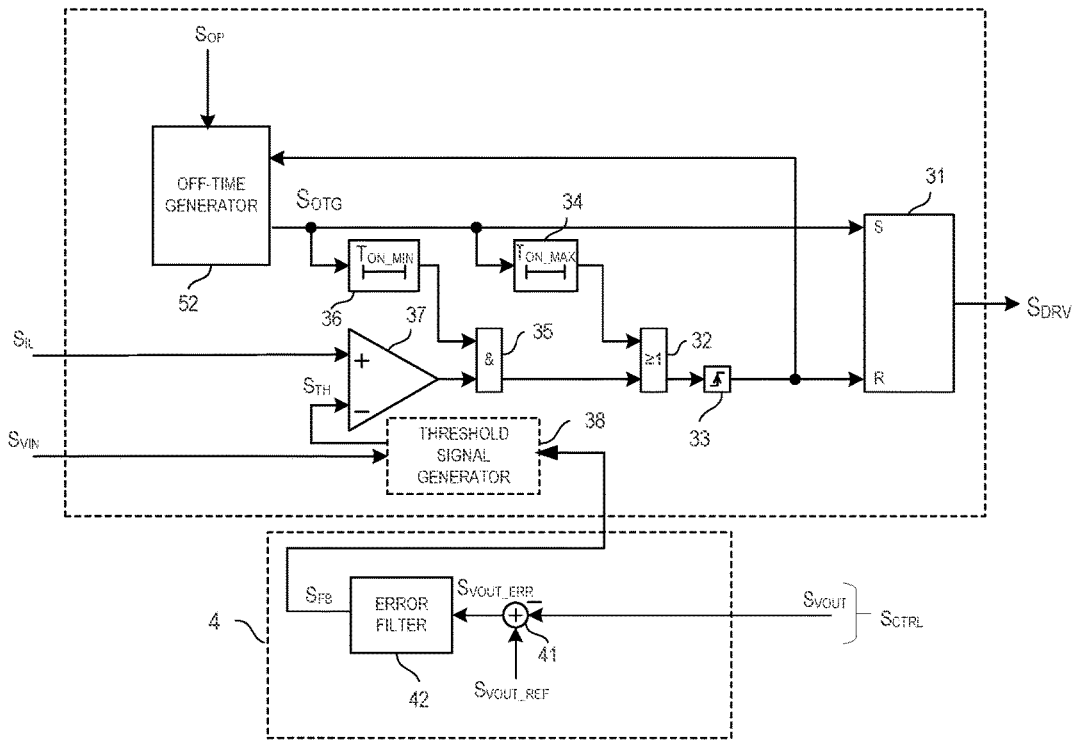
FIG. 26 shows another example of a controller shown in FIG. 1.

FIGS. 25 and 26 show different examples of the controller 3. The controller 3 according to FIG. 25 is configured to perform frequency control and the controller 3 according to FIG. 26 is configured to perform off-time control. Besides the controller 3, FIGS. 25 and 26 also show one example of the feedback circuit 4. Each of FIGS. 25 and 26 shows a block diagram of the controller 3. It should be noted that this block diagram illustrates the functional blocks of the controller 3 rather than a specific implementation. These functional blocks can be implemented in various ways. According to one example, these functional blocks are implemented using dedicated circuitry. According to another example, the controller 3 is implemented using hardware and software. For example, the controller 3 may include a microcontroller and software running on the microcontroller.

In the controller 3 shown in FIG. 25, the drive signal $S_{DRV}$ is available at an output Q of a flip-flop 31. This flip-flop 31 is an SR flip-flop 31, for example. A signal level of the drive signal $S_{DRV}$ is dependent on a state of the flip-flop 31. Just for the purpose of explanation it is assumed that the drive signal $S_{DRV}$ has an on-level when the flip-flop 31 has been set and an off-level when the flip-flop 31 has been reset. In the example shown in FIG. 25, the flip-flop 31 is set by a timer signal $S_{TIMER}$ received at a set input S of the flip-flop 31. A timer 41 is configured to generate the timer signal $S_{TIMER}$ such that the timer signal $S_{TIMER}$ includes a sequence of signal pulses, wherein each of these signal pulses sets the flip-flop 31 in order to generate an on-level of the drive signal $S_{DRV}$ and, therefore, switch on the electronic switch 22 (not shown in FIG. 25). The frequency at which the timer 41 generates the signal pulses defines the switching frequency f and, therefore, the drive cycle duration T=1/f explained above. The timer 51 receives a signal Sop that represents the at least one operation parameter OP explained above and is configured to adjust the drive cycle duration T in accordance with one of the examples explained above. Parameters or signals the controller 3 and the timer 51, respectively, receives and uses to adjust the drive cycle duration T are not explicitly shown in FIG. 25.

The flip-flop 31 is reset, so as to generate an off-level of the drive signal $S_{DRV}$, dependent on an output signal S37 of a comparator 37 that receives the inductor current signal $S_{IL}$ and the threshold signal $S_{TH}$. The comparator output signal S37 changes its signal level when the inductor current signal $S_{IL}$ reaches the threshold signal $S_{TH}$. An edge detector 33 connected downstream the comparator 37 detects this change of the signal level and resets the flip-flop 31 upon detecting that the comparator output signal S37 has changed its signal level.

Optionally, the flip-flop 31 is reset not only dependent on the comparator output signal S37 but also dependent on a minimum on-time signal S36. The minimum on-time signal S36 is generated by a minimum on-time circuit 36 that receives the timer signal $S_{TIMER}$. The minimum on-time signal S36 and the comparator output signal are logically combined such that the flip-flop 31 is not reset before a minimum on-time $T_{ON\_MIN}$ has lapsed after a signal pulse of the timer signal $S_{TIMER}$ has occurred, that is, after a drive cycle has started. The minimum on-time circuit 36 therefore ensures that the duration $T_{ON}$ of the on-period at least equals the minimum on-time $T_{ON\_MIN}$. Referring to FIG. 25, the comparator output signal S37 and the minimum on-time signal S36 are combined by an AND gate. The edge detector receives an output signal S35 of the AND gate in this case.

Referring to the above, generating the inductor current signal $S_{IL}$ may include measuring the inductor current $I_L$. Due to parasitic effects, the inductor current $I_L$ may oscillate for a certain time period after the electronic switch 22 has been switched on. During those oscillations, the inductor current signal $S_{IL}$ may reach the threshold signal $S_{TH}$, so that, absent the minimum on-time circuit 36, the electronic switch 22 might be switched off erroneously. The minimum on-time circuit 36 serves to blank out those oscillations in that the minimum on-time circuit 36 prevents the flip-flop 31 from being reset and, therefore, drive signal $S_{DRV}$ from assuming the off-level before the minimum on-time $T_{ON\_MIN}$ has lapsed.

Optionally, there is a maximum on-time circuit 34 that receives the timer signal $S_{TIMER}$. This maximum on-time circuit 34 generates a maximum on-time signal S34, whereas resetting the flip-flop 31 is also dependent on the maximum on-time signal S34. According to one example, the maximum on-time signal S34 resets the flip-flop 31 after a maximum on-time $T_{ON\_MAX}$ after the beginning of the on-period if the flip-flop 31 has not been reset before by the output signal of the comparator 37 or the AND gate 35, respectively. The maximum on-time circuit 34 therefore limits a duration of the on-period to the maximum on-time $T_{ON\_MAX}$. In the example shown in FIG. 25 this is achieved by an OR gate 32 that receives the maximum on-time signal S34 and the output signal S35 of the AND gate 35 and an output signal of which is received by the edge detector.

Referring to the above, the threshold signal $S_{TH}$ is generated dependent on the feedback signal $S_{FB}$ which, in turn, is dependent on the control signal $S_{CTRL}$. In the example shown in FIG. 25, the control signal includes an output voltage signal $S_{VOUT}$, so that the feedback signal $S_{FB}$ and, therefore, the threshold signal $S_{TH}$ is generated dependent on the output voltage signal $S_{VOUT}$. This output voltage signal $S_{VOUT}$ represents the output voltage $V_{OUT}$. According to one example, the output voltage signal $S_{VOUT}$ is proportional to the output voltage $V_{OUT}$. In the example shown in FIG. 25, a subtractor 41 of the feedback circuit 4 subtracts the output voltage signal $S_{VOUT}$ from an output voltage reference signal $S_{VOUT\_REF}$ to generate an error signal $S_{VOUT\_ERR}$. The output voltage reference signal $S_{VOUT\_REF}$ represents the desired signal level (set level) $V_{OUT\_REF}$ of the output voltage $V_{OUT}$. An error filter 42 filters the error signal $S_{VOUT\_ERR}$ to generate the feedback signal $S_{FB}$. According to one example, the error filter 42 has one of an integral (I), proportional (P), proportional-integral (PI), or proportional-integral-derivative (PID) characteristic.

A threshold signal generator 38 of the controller 3 receives the feedback signal $S_{FB}$ and generates the threshold signal $S_{TH}$ dependent on the timer signal $S_{TIMER}$ and the feedback signal $S_{FB}$. In particular, the threshold signal generator 42 generates a sawtooth signal with a frequency defined by the timer signal $S_{TIMER}$, a start threshold and a slope of the individual falling edges of the sawtooth signal, wherein the start threshold and slope defined by the feedback signal $S_{FB}$.

The feedback signal $S_{FB}$ represents the load Z, more particularly, a power consumption of the load, and the input voltage $V_{IN}$. According to one example, the feedback signal $S_{FB}$ is generated such that a signal level of the feedback signal $S_{FB}$ increases as the power consumption of the load increases, and the threshold signal generator 38 is configured to generate the threshold signal $S_{TH}$ such that the start threshold and the slope increase as the feedback signal $S_{FB}$ increases. An increasing start threshold and slope of the threshold signal $S_{TH}$ result in an increase of the average input current and, therefore, the average input power increases in order to meet the power consumption of the load Z. Equivalently, the start value of the threshold signal $S_{TH}$ decreases as the feedback signal $S_{FB}$ decreases, so that the average input current $I_{IN}$ decreases when the feedback signal $S_{FB}$ signals a decreasing power consumption of the load Z.

FIG. 26 shows a block diagram of a controller 3 configured to drive the electronic switch in accordance with an off-time control. The controller 3 shown in FIG. 26 is based on the controller 3 shown in FIG. 25, whereas same features have the same reference numbers. In the following, only differences between the controller 3 shown in FIG. 25 and the controller 3 shown in FIG. 26 are explained. With regard to those features of the controller 3 shown in FIG. 26 that are included in the controller shown in FIG. 25 reference to the description of FIG. 25 is made.

The controller 3 shown in FIG. 26 is different from the controller 3 shown in FIG. 25 in that the set input S of the flip-flop 31 receives an off-time generator signal $S_{OTG}$ from an off-time generator 52. This off-time generator 52 receives the same signal the flip-flop 31 receives at the reset input R. The off-time generator 52 is configured to generate its output signal $S_{OTG}$ such that the flip-flop 31 is set (in order to generate an on-level of the drive signal $S_{DRV}$) a predefined time period after the flip-flop 31 has been reset (in order to generate an off-level of the drive signal $S_{DRV}$). This predefined time period defines the off-time duration $T_{OFF}$. The off-time generator 52 receives a signal $S_{OP}$ that represents the at least one operation parameter OP explained above and is configured to adjust the off-time duration $T_{OFF}$ in accordance with one of the examples explained above. Parameters or signals the controller 3 and the off-time generator 52, respectively, receives and uses to adjust the off-time duration $T_{OFF}$ are not explicitly shown in FIG. 26.

The feedback signal $S_{FB}$ is generated in the way explained with reference to FIG. 25. Like the controller 3 explained with reference to FIG. 25, the controller shown in FIG. 26 is configured to regulate the output voltage $V_{OUT}$ so that the feedback signal $S_{FB}$ is generated based on the output voltage signal $S_{VOUT}$. The feedback signal $S_{FB}$ may be used as the threshold signal $S_{TH}$ in this controller 3. In this case, a signal level of the threshold signal $S_{TH}$ increases when an increasing signal level of the feedback signal $S_{FB}$ indicates an increasing power consumption of the load Z, whereas an increasing level of the threshold signal $S_{TH}$ results in longer on-periods and, therefore, an increasing average input current $I_{IN}$ and an increasing average input power.

Optionally, the threshold signal $S_{TH}$ is generated by a threshold signal generator 38 that receives the feedback signal $S_{FB}$ and an input voltage signal SATIN. The threshold signal generator 38 may multiply the two signals to provide the product $S_{FB}S_{VIN}$ as threshold signal so that the peak current follows the input voltage.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

Spatially relative terms such as "under," "below," "lower," "over," "upper" and the like, are used for ease of description to explain the positioning of one element relative to a second element. These terms are intended to encompass different orientations of the device in addition to different orientations than those depicted in the figures. Further, terms such as "first," "second" and the like, are also used to describe various elements, regions, sections, etc. and are also not intended to be limiting. Like terms refer to like elements throughout the description.

As used herein, the terms "having," "containing," "including," "comprising" and the like are open ended terms that indicate the presence of stated elements or features, but do not preclude additional elements or features. The articles "a," "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A method, comprising:
   operating a power converter that comprises an electronic switch connected in series with an inductor in one of a first operation mode and a second operation mode,
   wherein operating the power converter in each of the first operation mode and the second operation mode comprises driving the electronic switch in a plurality of successive drive cycles based on a drive parameter,
   wherein each of the plurality of successive drive cycles comprises an on-time in which the electronic switch is switched on and an off-time in which the electronic switch is switched off,
   wherein the drive parameter is one of a duration of the drive cycle or a duration of the off-time,
   wherein the drive parameter is predefined in the first operation mode, and
   wherein the drive parameter is increased in the second operation mode as compared to the first operation mode such that a duration of the on-time in the second operation mode is above a predefined duration threshold.

2. The method of claim 1, wherein driving the electronic switch in the on-time comprises:
   switching on the electronic switch in accordance with the drive parameter;
   monitoring a current flowing through the inductor; and
   switching off the electronic switch when the current reaches a current threshold.

3. The method of claim 2, wherein the current threshold is dependent on at least one control parameter.

4. The method of claim 3, wherein the at least one control parameter is selected from the group consisting of:
   an input voltage received by the power converter; and
   an output voltage supplied by the power converter.

5. The method of claim 4, wherein the control parameter defines a level of the current threshold.

6. The method of claim 4,
   wherein the current threshold varies in accordance with a sawtooth signal, and
   wherein the control parameter defines a start level and a slope of the sawtooth signal.

7. The method of claim 1, wherein operating the power converter in one of the first operation mode and the second operation mode comprises:
   monitoring an operation state of the power converter; and
   operating the power converter in one of the first operation mode and the second operation mode dependent on the operation state.

8. The method of claim 7, wherein monitoring the operation state comprises monitoring at least one operation parameter selected from the group consisting of:
   an input voltage of the power converter;
   an output voltage of the power converter; and
   a feedback signal.

9. The method of claim 1, wherein operating the power converter in the second operation mode comprises calculating the drive parameter based on at least one operation parameter.

10. The method of claim 9, wherein the at least one operation parameter is selected from the group consisting of:
    an input voltage of the power converter;
    an output voltage of the power converter; and
    a feedback signal.

11. The method of claim 9, wherein calculating the drive parameter comprises calculating the drive parameter based on a piecewise linear approximation.

12. The method of claim 1, wherein operating the power converter in one of the first operation mode and the second operation mode comprises:
    monitoring a duration of the on-time; and
    adapting the drive parameter dependent on the on-time.

13. The method of claim 12, wherein adapting the drive parameter comprises:
    one of increasing and decreasing the drive parameter each time the duration of the on-time falls below a first threshold; and
    the other one of increasing and decreasing the drive parameter each time the duration of the on-time rises above a second threshold.

14. The method of claim 13, further comprising:
    limiting the drive parameter to a nominal value.

15. The method of claim 1, wherein the drive parameter being predefined in the first operation mode comprises that the drive parameter is fixed.

16. The method of claim 1, wherein the drive parameter being predefined in the first operation mode comprises that the drive parameter varies in accordance with a predefined time scheme.

17. A power converter, comprising:
    an electronic switch connected in series with an inductor; and
    a controller configured to operate the power converter in one of a first operation mode and a second operation mode and, in each of the first operation mode and the second operation mode, to drive the electronic switch in a plurality of successive drive cycles based on a drive parameter such that each of the plurality of successive drive cycles comprises an on-time in which the electronic switch is switched on and an off-time in which the electronic switch is switched off, wherein the drive parameter is one of a duration of the drive cycle or a duration of the off-time, wherein the drive parameter is predefined in the first operation mode, and wherein the controller is configured to increase the drive parameter in the second operation mode as compared to the first operation mode such that a duration of the on-time in the second operation mode is above a predefined duration threshold.

18. The power converter of claim 17, wherein the controller is configured to monitor an operation state of the power converter, and operate the power converter in one of the first operation mode and the second operation mode dependent on the operation state.

19. The power converter of claim 17, wherein the controller is configured, in the second operation mode, to calculate the drive parameter based on at least one operation parameter.

20. The power converter of claim 17, wherein the controller is configured, in the first operation mode and the second operation mode, to monitor a duration of the on-time and adapt the drive parameter dependent on the on-time.

21. A power converter, comprising:
a controller configured to operate the power converter in one of a first operation mode and a second operation mode and, in each of the first operation mode and the second operation mode, to drive an electronic switch in a plurality of successive drive cycles based on a drive parameter such that each of the plurality of successive drive cycles comprises an on-time in which the electronic switch is switched on and an off-time in which the electronic switch is switched off, wherein the drive parameter is one of a duration of the drive cycle or a duration of the off-time, wherein the drive parameter is predefined in the first operation mode, and wherein the controller is configured to increase the drive parameter in the second operation mode as compared to the first operation mode such that a duration of the on-time in the second operation mode is above a predefined duration threshold.

22. The power converter of claim 21, wherein the controller is configured to monitor an operation state of the power converter, and operate the power converter in one of the first operation mode and the second operation mode dependent on the operation state.

23. The power converter of claim 21, wherein the controller is configured, in the second operation mode, to calculate the drive parameter based on at least one operation parameter.

24. The power converter of claim 21, wherein the controller is configured, in the first operation mode and the second operation mode, to monitor a duration of the on-time and adapt the drive parameter dependent on the on-time.

* * * * *